United States Patent
Hubbard et al.

(10) Patent No.: US 7,024,299 B2
(45) Date of Patent: Apr. 4, 2006

(54) METHOD FOR DYNAMICALLY DETERMINING PEAK OUTPUT TORQUE WITHIN BATTERY CONSTRAINTS IN A HYBRID TRANSMISSION INCLUDING A PARALLEL HYBRID SPLIT

(75) Inventors: Gregory A. Hubbard, Brighton, MI (US); Tung-Ming Hsieh, Carmel, IN (US); Anthony H. Heap, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/112,216

(22) Filed: Apr. 22, 2005

(65) Prior Publication Data

US 2005/0256623 A1    Nov. 17, 2005

Related U.S. Application Data

(60) Provisional application No. 60/571,662, filed on May 15, 2004.

(51) Int. Cl.
*G06F 7/00* (2006.01)

(52) U.S. Cl. .............................. 701/54; 477/3; 180/65.8

(58) Field of Classification Search .................. 701/51, 701/52, 53, 54, 58, 61, 101, 102; 60/705, 60/706; 180/65.2–65.8; 290/40 B, 40 C, 290/40 F; 318/139; 475/5; 477/2–5, 15
See application file for complete search history.

(56) References Cited

U.S. PATENT DOCUMENTS

| | | | |
|---|---|---|---|
| 6,299,563 B1 * | 10/2001 | Shimasaki | 477/5 |
| 6,321,144 B1 * | 11/2001 | Crombez | 701/22 |
| 6,883,626 B1 * | 4/2005 | Aoki et al. | 180/65.2 |
| 6,889,126 B1 * | 5/2005 | Komiyama et al. | 701/22 |
| 6,907,337 B1 * | 6/2005 | Phillips et al. | 701/51 |
| 6,932,176 B1 * | 8/2005 | Takami et al. | 180/65.2 |
| 6,960,152 B1 * | 11/2005 | Aoki et al. | 477/3 |

\* cited by examiner

*Primary Examiner*—Richard M. Camby
(74) *Attorney, Agent, or Firm*—Christopher DeVries

(57) ABSTRACT

A method for determining output torque limits of a powertrain including an electrically variable transmission relies upon a model of the electrically variable transmission. Transmission operating space is defined by electric machine torque constraints, engine torque constraints and battery power constraints. Output torque limits are determined at the limits of the transmission operating space.

24 Claims, 20 Drawing Sheets

METHOD FOR DYNAMICALLY DETERMINING PEAK OUTPUT TORQUE WITHIN BATTERY CONSTRAINTS IN A HYBRID TRANSMISSION INCLUDING A PARALLEL HYBRID SPLIT

CROSS REFERENCE TO RELATED APPLICATIONS

This application claims priority to U.S. Provisional Ser. No. 60/571,662 filed on May 15, 2004, which is hereby incorporated herein by reference in its entirety.

TECHNICAL FIELD

The present invention is related to control of a vehicular powertrain. More particularly, the invention is concerned with real-time, on-vehicle determinations of output torque limitations of an electrically variable transmission.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

It is known in the art of vehicular powertrain controls to interpret an operator's request for torque into a system torque command to effect an output torque to the vehicle driveline. Such interpretation and command require relatively simple control management dominated by the available engine torque in relation to a vehicle's present set of operating parameters, which relationship is relatively well understood. In electrically variable transmission based hybrid powertrains a number of factors in addition to the available engine torque affect the output torque that can be provided to the vehicle driveline. It is known in such hybrid powertrains to interpret an operator's request for torque into a system torque command and allow individual sub-system limitations to dictate actual output torque. Such limitations include, for example, available engine torque, available electric machine torque and the available electrical energy storage system power. It is preferable to understand the various subsystem individual and interactive constraints affecting available powertrain output torque such that output torque commands are issued consistent with such torque availability and subsystem constraints.

Available development tools and modeling may provide some understanding of electrically variable transmission based hybrid powertrain available output torque. But such techniques are generally limited to steady state operation, neglecting the significance of inertia torques upon the powertrain from vehicle dynamic conditions including vehicular and powertrain (engine and electric machine) accelerations. Such techniques are also generally iterative in nature and rely on human intervention is determining what parameters are held constant and what parameters are to be solved for. Such techniques, therefore, are ill equipped for adaptation to real-time, on-vehicle, dynamic, multi-variable solutions for effective control.

SUMMARY OF THE INVENTION

A vehicular powertrain includes an engine, an electrically variable transmission including at least one electric motor, an electrical storage device and a driveline. The engine is operatively coupled to the electrically variable transmission at an input thereof and the driveline is operatively coupled to the electrically variable transmission at an output thereof.

A method for determining output torque limits of the powertrain includes determining the feasible motor torque operating space and various sets of output torque limits within the feasible motor torque operating space are determined. A first set of output torque limits is based upon predetermined motor torque limits and predetermined engine torque limits; a second set of output torque limits is based upon predetermined electrical storage device power limits and the predetermined motor torque limits; and, a third set of output torque limits is based upon the predetermined electrical storage device power limits and the predetermined engine torque limits. The overall output torque limits of the powertrain are determined as the most constrained of output torques from the first, second and third sets of output torque limits.

A method for determining output torque limits of the powertrain includes determining electrical storage device power limits, motor torque limits and engine torque limits. Input torque limits are determined as the most constrained of input torques corresponding to the engine torque limits and the motor torque limits. A first set of output torque limits is determined as the least constrained of output torques corresponding to the input torque limits at the motor torque limits; a second set of output torque limits is determined as the least constrained of output torques corresponding to the electrical storage device power limits at the motor torque limits and output torques corresponding to the motor torque limits within the electrical storage device power limits; and, a third set of output torque limits is determined as the least constrained of output torques corresponding to the electrical storage device power limits at the input torque limits and output torques corresponding to the input torque limits at the motor torque limits within the electrical storage device power limits. The overall output torque limits of the powertrain are determined as the most constrained of output torques from the first, second and third sets of output torque limits.

A method for determining output torque limits of the powertrain includes determining least constrained motor limited input torques corresponding to predetermined motor torque limits and determining engine limited input torques corresponding to predetermined engine torque limits. Input torque limits are selected as the most constrained of the motor limited input torques and engine limited input torques so determined. A first set of output torque limits is determined as the least constrained of output torques corresponding to the input torque limits and the predetermined motor torque limits; a second set of output torque limits is determined as the least constrained of output torques corresponding to predetermined electrical storage device power limits at the predetermined motor torque limits and output torques corresponding to the predetermined motor torque limits within the predetermined electrical storage device power limits; and, a third set of output torque limits is determined as the least constrained of output torques corresponding to the predetermined electrical storage device power limits at the input torque limits and output torques corresponding to the input torque limits at the predetermined motor torque limits within the predetermined electrical storage device power limits. The overall output torque limits of the powertrain are determined as the most constrained of output torques from the first, second and third sets of output torque limits.

DESCRIPTION OF THE PREFERRED EMBODIMENT

Figure 1:
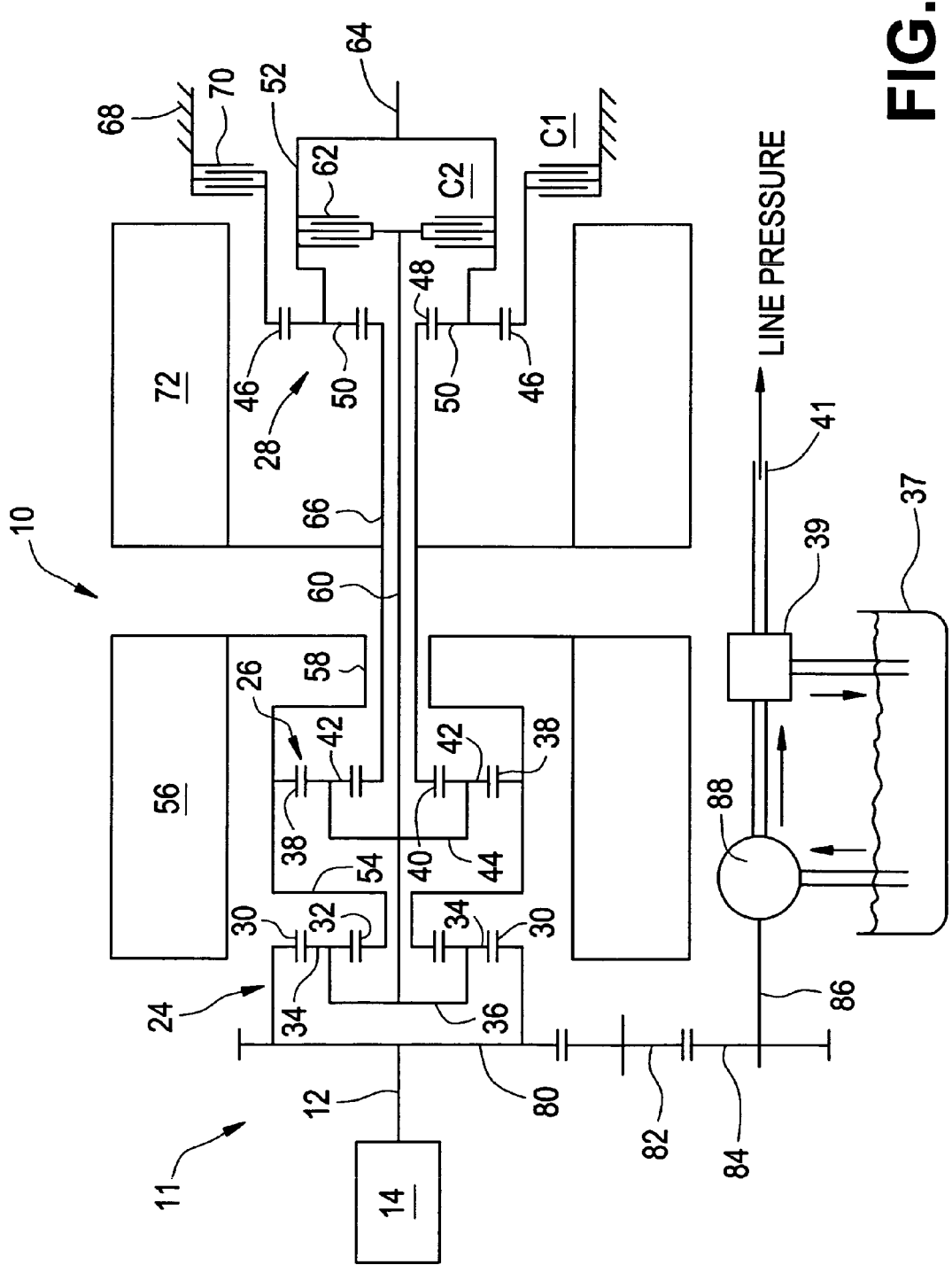
FIG. 1 is a mechanical hardware schematic representation of one preferred form of a two-mode, compound-split, electrically variable transmission particularly suited to the implementation of the present invention.
Figure 2:
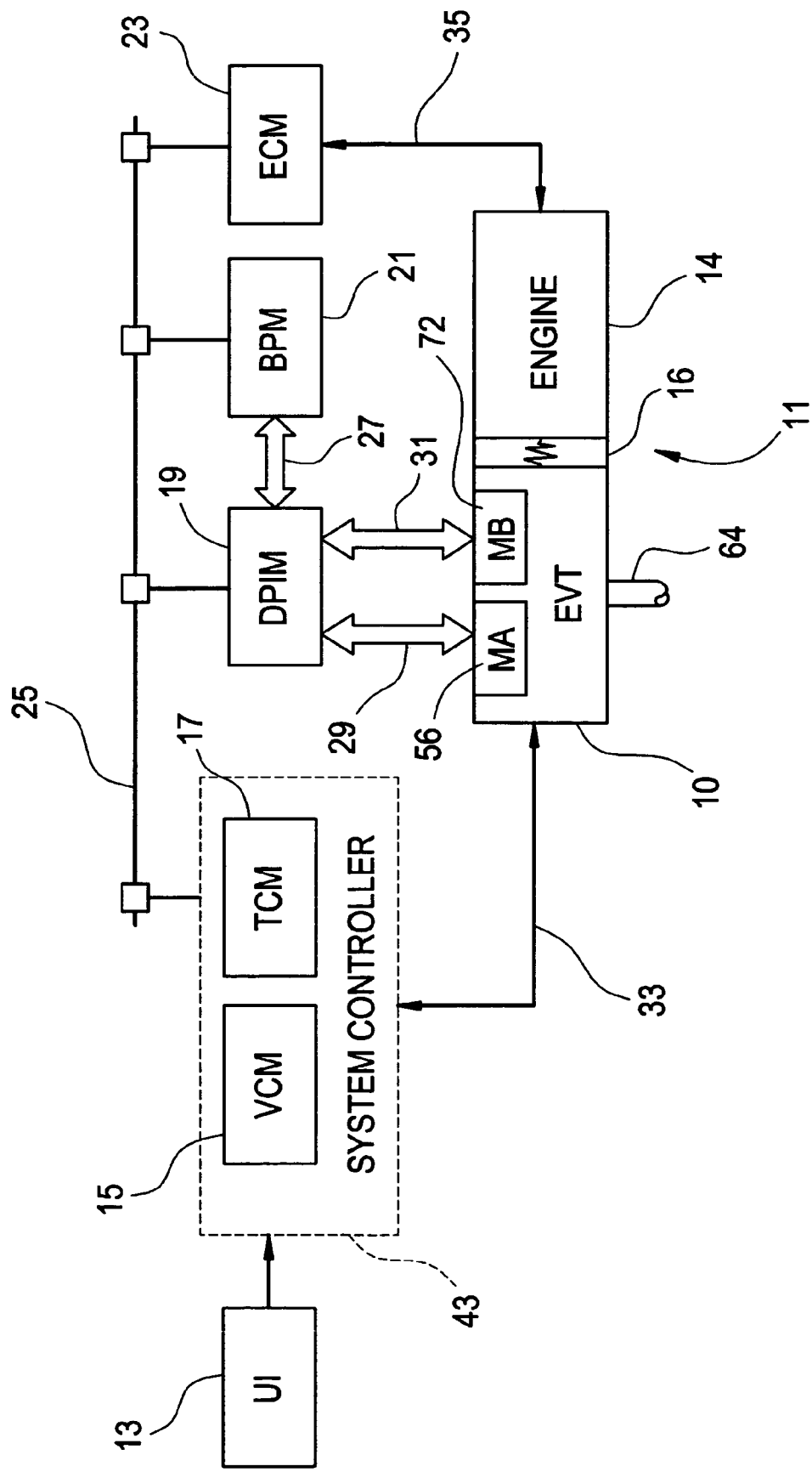
FIG. 2 is an electrical and mechanical schematic of a preferred system architecture for the hybrid powertrain disclosed herein.

With reference first to FIGS. 1 and 2, a vehicular powertrain system is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e., the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used. Those skilled in the art will recognize MODE 1 as an input split arrangement and MODE 2 as a compound split arrangement.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engine electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM)

21. The powertrain system also includes such energy storage devices which are an integral part of the power flows thereof. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others.

System controller 43 determines a torque command Te_cmd and provides it to ECM 23. Torque command Te_cmd is representative of the EVT torque contribution desired from the engine as determined by the system controller. System controller 43 also determines a speed command Ne_des representative of the EVT input speed desired, which in the direct coupled arrangement between the engine and the EVT is also the desired engine speed operating point. With the direct coupled arrangement exemplified herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein. Desired input torque operating points are preferably determined as disclosed in commonly assigned and co-pending U.S. Ser. No. 10/799,531 which is incorporated herein by reference. Desired input speed operating points are preferably determined as disclosed in commonly assigned and co-pending U.S. Ser. Nos. 10/686,508 and 10/686,034 which are incorporated herein by reference. A preferred speed control for a hybrid transmission is described in detail in commonly assigned and co-pending U.S. Ser. No. 10/686,511 which is incorporated herein by reference.

The various modules described (i.e., system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
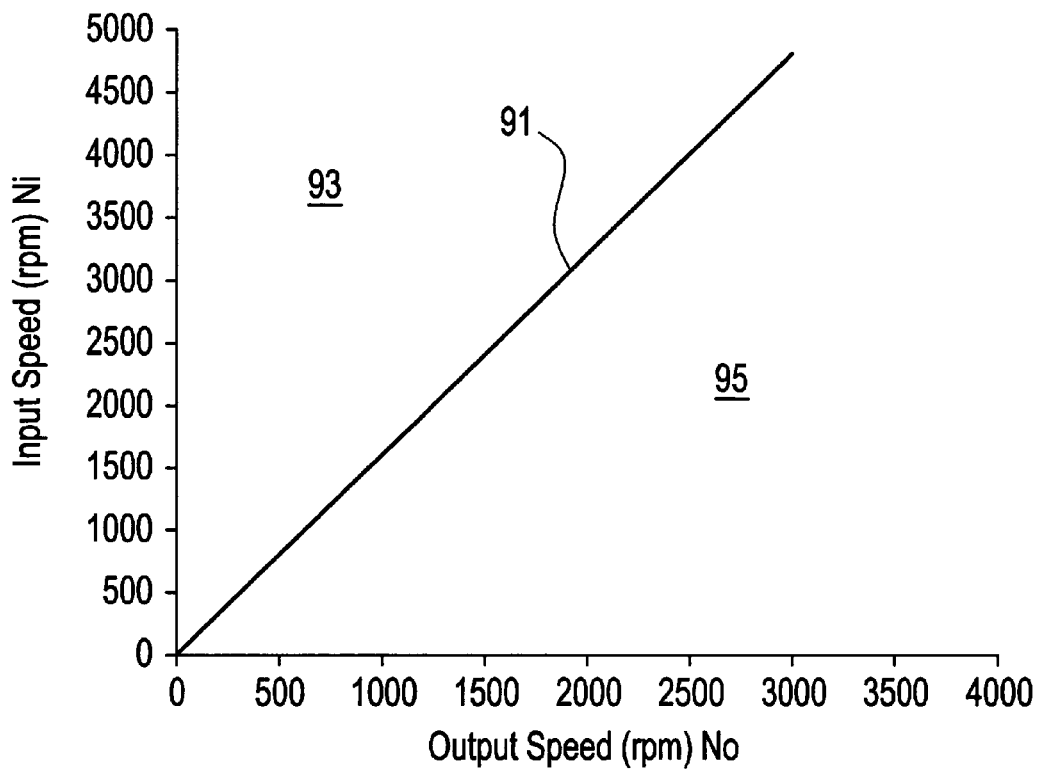
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 95. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4A:
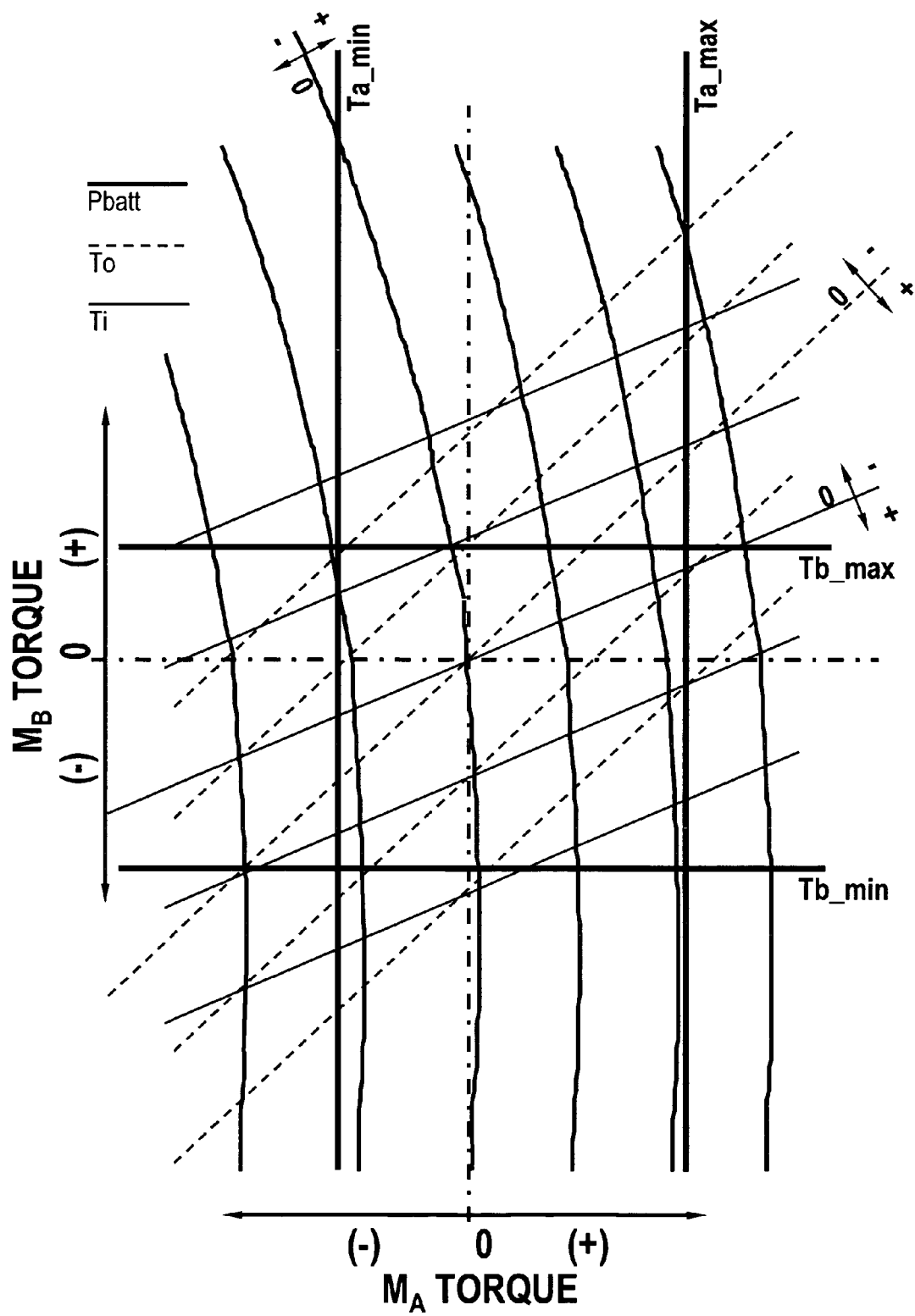
FIG. 4A is a torque space plot in motor torques (Ta and Tb) including lines of constant battery power (Pbat), lines of constant output torque (To) and lines of constant input torque Ti for MODE 2 operation of the exemplary electrically variable transmission of FIG. 1.

With reference now to FIG. 4A, an exemplary partial motor torque space (Ta-Tb space) for MODE 2 operation shows motor A ($M_A$) torque plotted across the horizontal axis and motor B ($M_B$) torque plotted across the vertical axis at given values of Na and Nb. Boundaries are drawn corresponding to certain exemplary maximum and minimum motor A torques (Ta_min, Ta_max), the maximum and minimum being with respect to motor capabilities at certain exemplary present operating conditions in Na (i.e., Ni, No and Mode), the precise values of which are not required for the present exposition of the teachings to be gained from FIG. 4 and the present discussion. Similar boundaries are drawn corresponding to such exemplary maximum and minimum motor B torques (Tb_min, Tb_max), the maximum and minimum being with respect to motor capabilities at certain exemplary present operating conditions in Nb (i.e., Ni, No and Mode). The space bounded by maximum and minimum motor torques represents a feasible solution space at present conditions for the motor units $M_A$ and $M_B$. This is a general representation of a feasible motor torque solution space for a two motor EVT powertrain system, such as powertrain system 11, however, it is believed that the general concepts described herein for a two motor system may be extended by one of ordinary skill to powertrain systems comprising more than two electric machines which are operably and selectively coupled, such as in the manner described herein, to the transmission, to define a corresponding multi-dimensional solution space of feasible motor torques.

Within this motor torque space are plotted several other parameter lines of constant values for a given value of Ni_dot and No_dot. A plurality of lines of constant battery power, Pbat, are plotted which represent constant battery power solutions within the motor torque space. Also plotted within this motor torque space are lines of constant output torque, To, which represent constant output torque solutions within the space. Finally, lines of constant input torque are plotted within the motor torque space and represent constant input torque solutions therein. Increasing and decreasing trend directions for these respective lines of constancy are shown by respective double-sided arrows associated with respective null lines of constancy.

It is noted here that while the trend and slope relationships among the torque lines (To, Ti, Ta and Tb) remain the same as shown in FIG. 4A for other system operating conditions in Ni, No, Ni_dot and No_dot, the lines of constant battery power can change significantly from the example shown in the figure. In fact, the lines of constant battery power are segments of closed, substantially elliptical, constant battery powers. Viable operating conditions in Ni, No, Ni_dot and No_dot may include Ta-Tb space intersections with lines of constant battery power which substantially transpose the trend relationship of the battery powers illustrated in FIG. 4A, for example. In fact, the Ta-Tb space may locate in substantially any orientation relative to the foci of the battery power ellipses thereby resulting in substantially any orientation and trend of the lines of constant battery power intersecting the Ta-Tb space. And, the Ta-Tb space may locate closer to the foci of battery power ellipses thus resulting in sharper curvature of the lines of constant battery power intersecting the Ta-Tb space and potentially increasing the intersections thereof with the Ta-Tb limits.

In the graphic representation of FIG. 4A, while the sub-space with respect to determined Ta and Tb minimums and maximums (Ta_min, Ta_max, Tb_min, Tb_max) is feasible in accordance with the torque capabilities of the respective motor units, the lines of constant battery power (Pbat), lines of constant output torque (To) and lines of constant input torque (Ti) are not necessarily representative of feasible solutions with respect to their respective sub-system capabilities at present conditions but do represent theoretically unconstrained modeling of the system within the motor torque space.

Figure 4B:
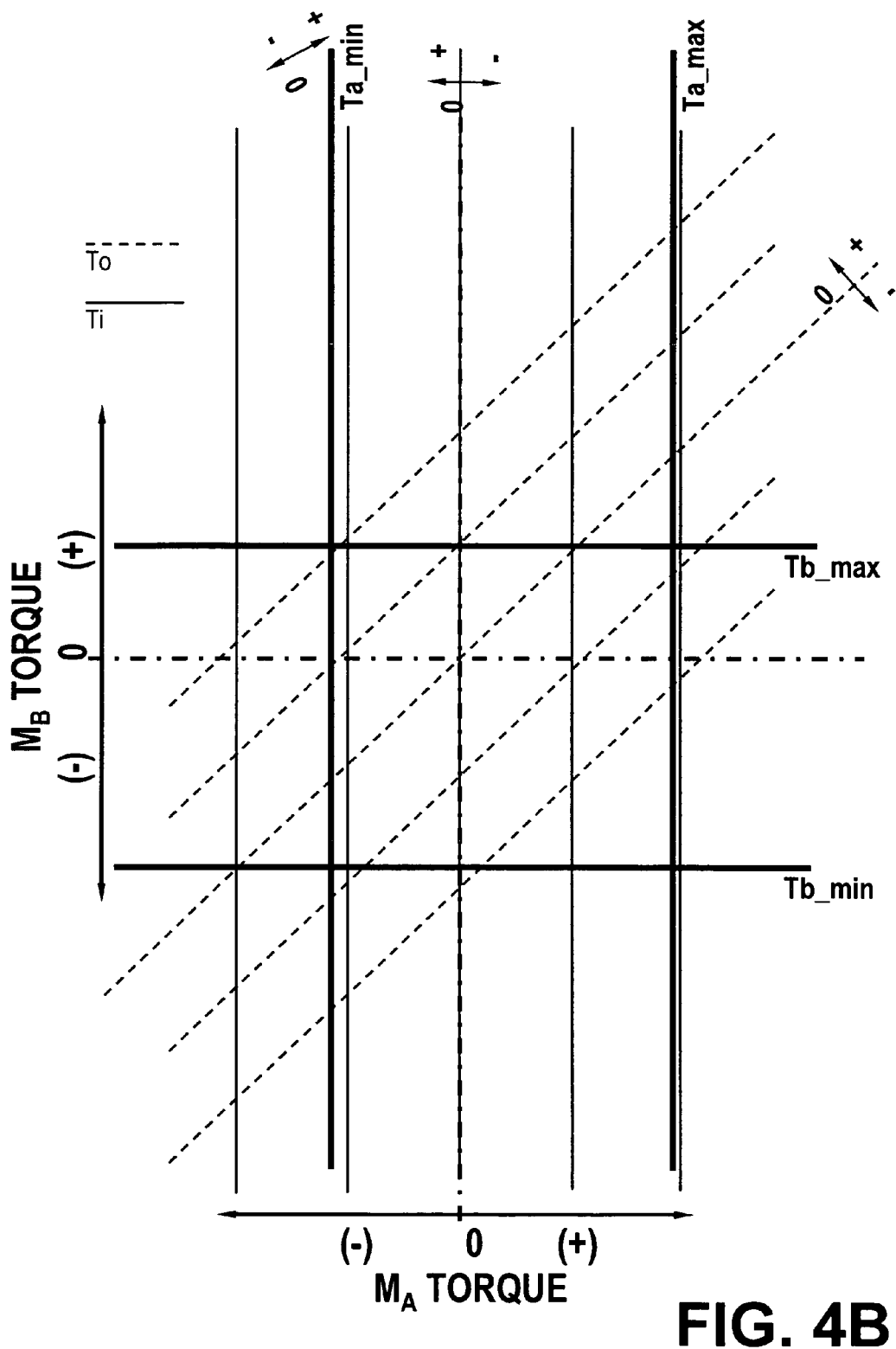
FIG. 4B is a torque space plot in motor torques (Ta and Tb) including lines of constant output torque (To) and lines of constant input torque Ti for MODE 1 operation of the exemplary electrically variable transmission of FIG. 1.

As indicated, FIG. 4A represents a torque space qualified for MODE 2 operation. A similar torque space is understood for MODE 1 and is illustrated in FIG. 4B. FIG. 4B does not show lines of constant battery power, however, for the sake of clarity. It is significant to note that in FIG. 4B the lines of constant input torque appear vertically since in the input split configuration of MODE 1, the input torque is decoupled from the motor B torque. Also, it is noted that input torque, Ti, increases from right to left in the figure, and output torque, To, increases from the lower right to the upper left.

The specific case of MODE 2 underscores the general rule that the motor torque space as described and set forth herein is adaptable to all EVT configurations and modes established by the numerous possible coupling combinations between motors, engines and outputs of an electrically variable transmission, including modes which completely decouple inputs and outputs from one or more motor torques. Therefore, separate, detailed discussion will not be made of MODE 1 in exemplifying the present invention. But, certain notable differences or distinctions applicable to MODE 1 may be pointed out throughout the description of MODE 2. It is understood that the more general case of MODE 2 operation wherein the input is torque coupled to both motors A and B is sufficient for one skilled in the art to understand its application to more specific cases, including complete torque decoupling of one or more motors from the EVT input.

Within this motor torque space it is desirable to determine a maximum or peak available or feasible output torque. Such a peak output torque is subject to or defined by the various limits of the system, sub-system and components. A preferred method for determining maximum available output torque within a feasible solution space in accordance with motor and engine torque limits is set forth below in reference to the flow chart of FIG. 6 and the more detailed Ta-Tb space diagrams of FIGS. 7–10. The flow chart illustrates representative steps for carrying out the method of the present invention comprising instructions implemented as part of the executable computer code and data structures of system controller 43. The instructions represented thereby are, of course, executed as a part of a much larger group of instruction sets and routines carrying out the various control and diagnostic function of the powertrain previously described.

A model of the EVT is provided which includes steady state and dynamic EVT system parameters. In its basic form—suitably arranged for machine torque resolution—the model is represented as follows:

$$\begin{bmatrix} Ta \\ Tb \end{bmatrix} = [K_1] \begin{bmatrix} Ti \\ To \\ Ni\_dot \\ No\_dot \end{bmatrix} \quad (1)$$

where
Ta is motor A torque;
Tb is motor B torque;
Ti is EVT input torque;
To is EVT output torque;
Ni_dot is EVT input acceleration;
No_dot is EVT output acceleration; and $[K_1]$ is a 2×4 matrix of parametric values determined by the hardware gear and shaft interconnections and estimated hardware inertias applicable to the current drive range.

An additional torque error term is preferably incorporated into the model yielding the preferred form represented as follows:

$$\begin{bmatrix} Ta \\ Tb \end{bmatrix} = [K_2] \begin{bmatrix} Ti \\ To \\ Ni\_dot \\ No\_dot \\ Ucl \end{bmatrix} \quad (2)$$

where, as distinguished from the model as represented in equation (1) herein above,
Ucl is a measured torque error term that is based upon dynamic conditions, e.g. input speed error; and
$[K_2]$ is a 2×5 matrix of parametric values that further includes parameters for scaling the measured torque error term Ucl to modify the motor torques Ta and Tb.

Additional details respecting the measured torque error term and preferred method for determination thereof is found in commonly assigned and co-pending U.S. Ser. No. 10/686,511.

Various powertrain model parameters are measured or otherwise predetermined. Output speed, No, and input speed, Ni, are preferably derived from sensed and filtered motor speeds, Na and Nb, which are known through sensing, or derived through the motor control phase information. The input speed, Ni, and output speed, No, can be derived from motor speeds in accordance with the following known coupling constraint equation:

$$\begin{bmatrix} Ni \\ No \end{bmatrix} = [K_3] \begin{bmatrix} Na \\ Nb \end{bmatrix} \quad (3)$$

where
Na is motor A speed,
Nb is motor B speed,
Ni is EVT input speed,
No is EVT output speed, and
$[K_3]$ is a 2×2 matrix of parametric values determined by the hardware gear and shaft interconnections.

Output speed acceleration, No_dot, is preferably determined in accordance with the derived output speed, No, whereas input acceleration, Ni_dot, is preferably a desired rate of change of input speed based on derived input speed, Ni, and profile/rate limit control as taught in commonly assigned and co-pending U.S. Ser. No. 10/686,511.

Figure 6:
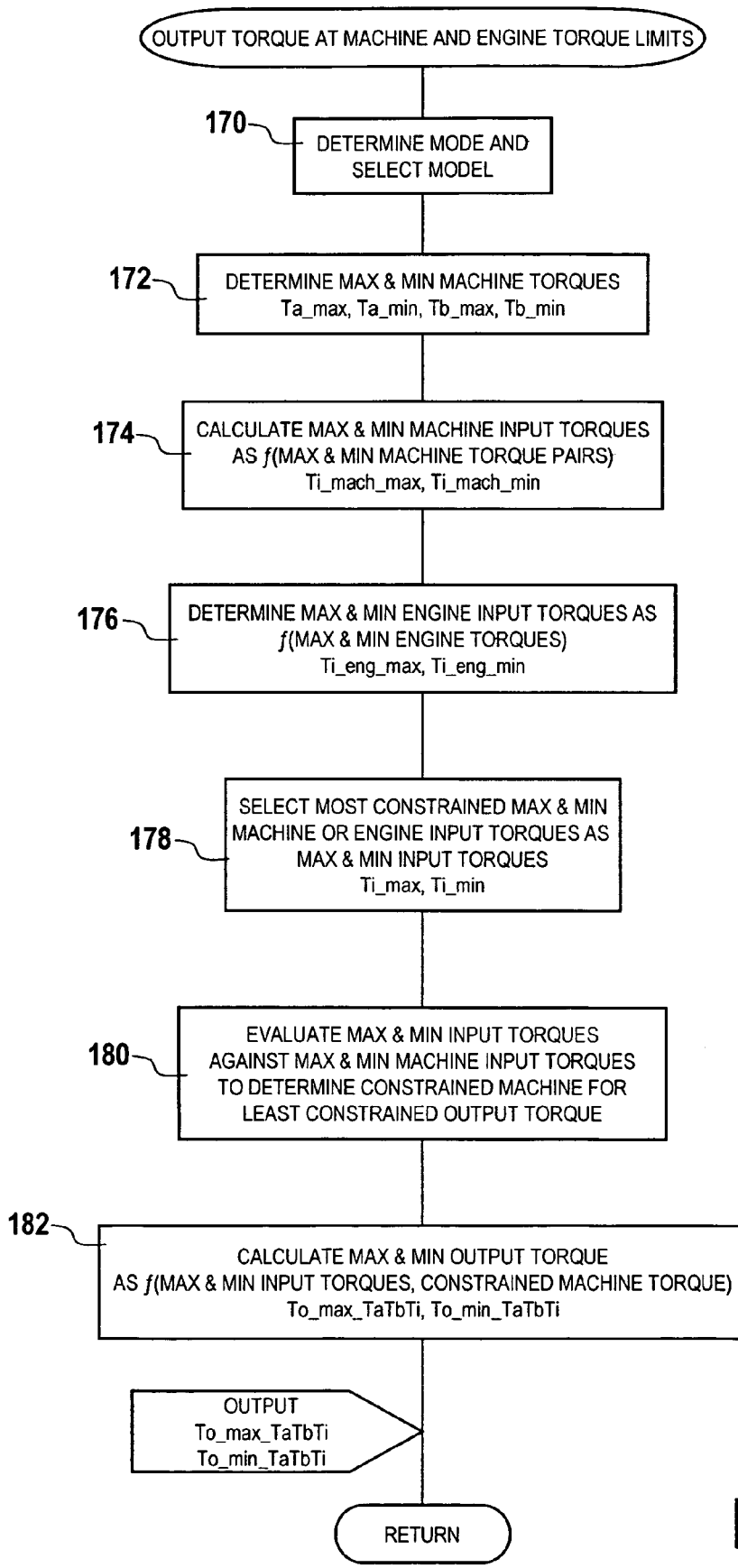
FIG. 6 is a flow chart illustrating exemplary steps in a set of instructions executed by a computer based controller particularly related to dynamically determining peak output torque in accordance with the present invention.

With reference now to the flow chart of FIG. 6, a set of exemplary steps for carrying out the present invention begins by determination of the appropriate model for use in accordance with the presently active mode of the EVT at block 170. As noted herein before, the basic form of the model from one mode to the next remains the same, but the matrix of parametric values may be different in accordance with the hardware gear and shaft interconnections and estimated hardware inertias applicable to the drive range of interest. Machine torque limits are next determined at block 172. Since it is an objective at this point to determine EVT operation at various system limits or constraints, machine torque limits for Ta and Tb provide the values used to calculate input torque, Ti, in accordance with such machine torque limits. The machine torque limits refer to maximum and minimum motor torques, individually, and more particularly to pairs of such complementary maximum and minimum motor torques.

Figure 5:
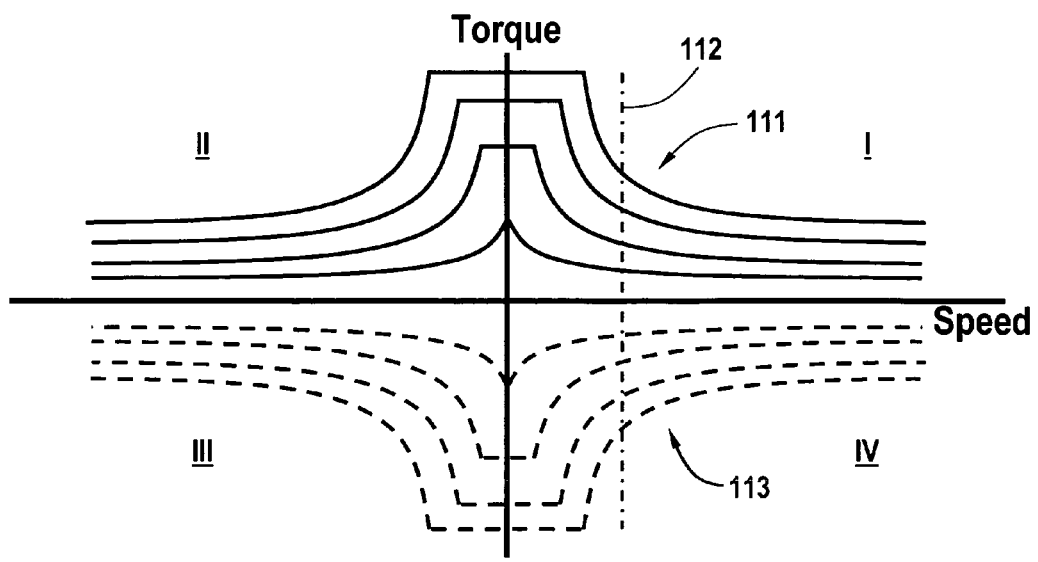
FIG. 5 is a graphical depiction of empirically determined motor torque vs. speed characteristic data utilized in the determination of feasible Ta-Tb torque space in accordance with the present invention.

Limits or constraints on motor torques are reflected in FIG. 5 wherein maximum and minimum motor torques (Ta_min, Ta_max, Tb_min and Tb_max) within the present condition capabilities of the motors are preferably obtained from data sets stored in table form within data structures in system controller 43. Such data sets are provided for reference by the routine in pre-stored table format having been empirically derived from conventional dynamometer testing of the combined motor and power electronics (e.g. power inverter) at various temperature and voltage conditions. An exemplary representation of such characteristic motor torque vs. speed data is illustrated in FIG. 5 wherein maximum and minimum data for a given speed are represented by the line of constant speed 112 intersecting exemplary lines of constant temperature/voltage 111, 113. The tabulated data is referenced by the motor speed (Na, Nb), voltage and temperature.

While the motors are used in both motoring and generating modes—suggesting four-quadrants (I, II, III, IV) of torque/speed data—two quadrant data collection is generally sufficient wherein the data collected in adjacent quadrants is merely reflected in the other quadrants not directly measured. In the present example, quadrants I and II are shown with determined data 111 whereas quadrants III and IV are shown populated with reflected data 113 therefrom.

Preferably, maximum and minimum motor torques (Ta_min, Ta_max, Tb_min and Tb_max) derived from the data structures are further adjusted to ensure a reservation of a predetermined amount of torque capacity at the limits. Such reservation results in a Ta-Tb space for use in the EVT control that is more conservatively sized with respect to actual feasible Ta-Tb space. Various dynamic considerations make such reservation desirable, including such considerations as motor speed accelerations, and computational and executory loop cycle delays inherent in any computer based controller implementation. A preferred manner of determining such torque reservations is disclosed in co-pending and commonly assigned U.S. Ser. No. 10/846,153, the contents of which are incorporated herein by reference.

Figure 7:
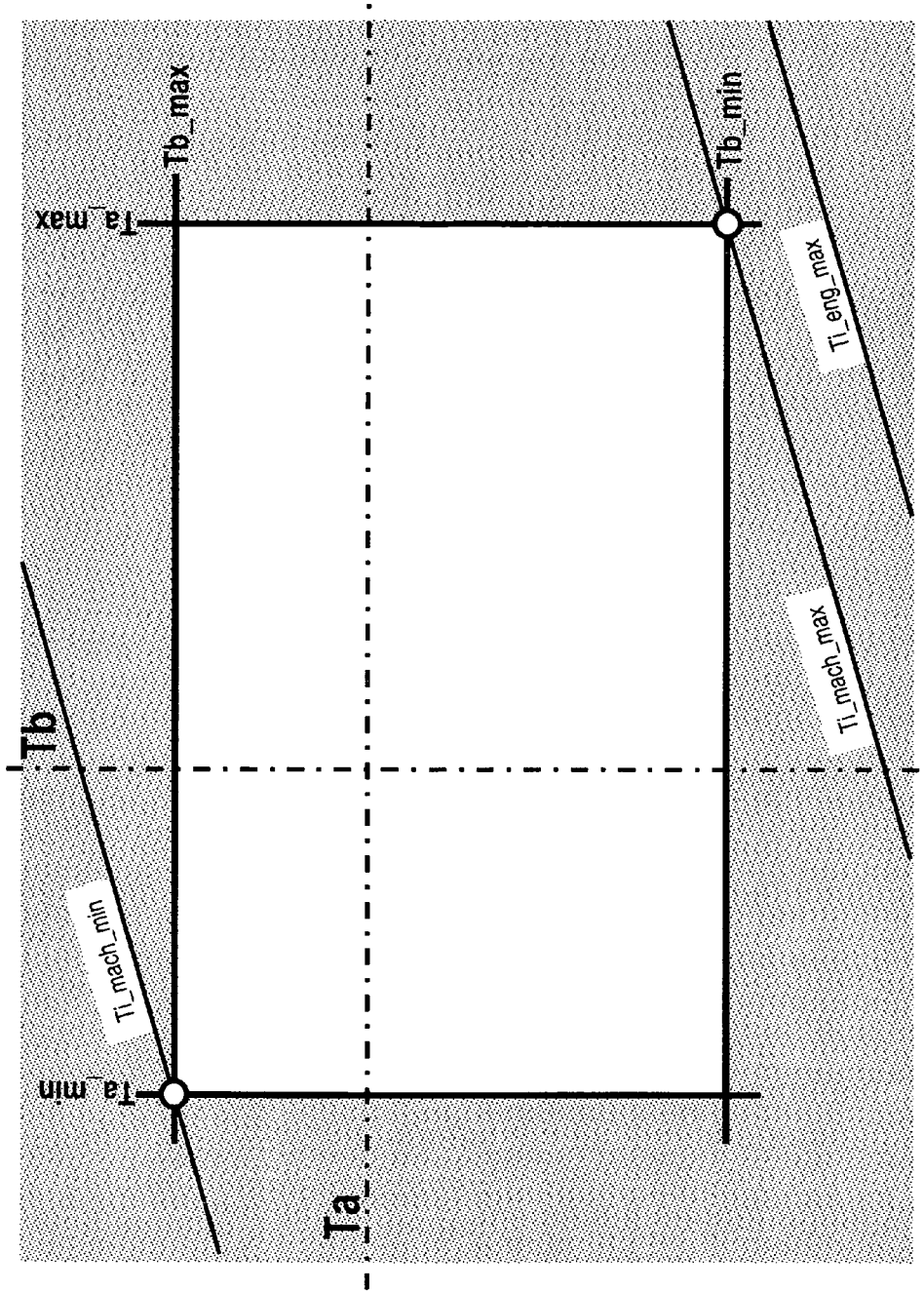
FIGS. 7–10 are graphical representations in Ta-Tb torque space of various steps and results thereof related to dynamically determining peak output torque in accordance with the present invention.

FIG. 7 shows the feasible Ta-Tb torque space as the central, unshaded portion within the various Ta and Tb maximum and minimum limits.

Next, block 174 calculates maximum and minimum input torques (Ti_mach_max and Ti_mach_min) corresponding to the maximum and minimum machine torque pairs. Block 174 requires manipulation of the model to rearrange for resolution of the desired parameters, in this instance input torque, from known or assumed parameters and takes the present form as follows:

$$\begin{bmatrix} Ti \\ To \end{bmatrix} = [K_4] \begin{bmatrix} Ta \\ Tb \\ Ni\_dot \\ No\_dot \\ Ucl \end{bmatrix} \quad (4)$$

where $[K_4]$ is a 2×5 matrix comprising the rearranged parametric values as set forth in equation (2) herein above.

From the above equation (4), input torques can be calculated corresponding to machine torques, Ta and Tb, through direct substitution of values thereof into the model. With additional reference to the Ta-Tb space in FIG. 7, and beginning at the upper right thereof and moving clockwise around the figure to intersections of the Ta and Tb limits, pairs of machine torque limits correspond to: Ta_max, Tb_max; Ta_max, Tb_min; Ta_min, Tb_min; and Ta_min, Tb_max. Individual substitutions of these four pairs of machine torque limits could be made into the model to return corresponding input torques. But, it is known from system Ta-Tb space characterizations (see FIG. 4A) that a maximum input torque at the machine limits corresponds to the Ta_max, Tb_min pair and that a minimum input torque at the machine limits corresponds to the Ta_min, Tb_max pair. Of course, for MODE 1 the orientation of the minimum and maximum output torques would be opposite as can be verified with reference to FIG. 4B. These pairs are distinguished in the figure by circles at respective machine torque limit pairs. Maximum input torque corresponding to the machine torque limits therefore is represented by the line of constant input torque labeled (Ti_mach_max) that is shown intersecting the Ta_max, Tb_min machine torque limit pair at the extreme lower-right intersection thereof in the figure. Similarly, minimum input torque corresponding to the machine torque limits therefore is represented by the line of constant input torque labeled (Ti_mach_min) that is shown intersecting the Ta_min, Tb_max machine torque limit pair at the extreme upper-left intersection thereof in the figure.

In MODE 1 operation wherein the engine does not further constrain the Ta-Tb space, Ti_mach_max and Ti_mach_min correspond directly to Ta_min and Ta_max, respectively. That is to say, Ti_mach_max overlies Ta_min and Ti_mach_min overlies Ta_max in the Ta-Tb torque space. And in MODE 1, if engine torque is more constraining than machine torque, the constrained engine torque maximum or minimum are essentially substituted for the Ta_min and Ta_max, respectively.

Block 176 next determines maximum and minimum input torques as a function of peak available engine torque (Ti_eng_max, Ti_eng_min). As previously described, the engine and EVT input are direct coupled. Therefore, there is a direct correspondence between the engine torque and the input torque. The engine torque is determined in relation to a present set of engine operating parameters, preferably engine speed and intake air pressure (atmospheric or boost depending on normal or turbo aspiration). Preferably, peak available engine torque is obtained from data sets stored in table form within data structures in system controller 43. Such data sets are provided for reference by the routine in pre-stored table format having been empirically derived from conventional dynamometer testing or as provided in engine manufacturer specification data. Other factors such as air density, fuel type (for propulsion), engine retarder activation (for braking), and controlled limits (e.g. fault responsive engine output limiters) may be considered in determining peal available engine torque. Alternatively, the ECM 23 may provide engine peak performance data substantially real-time, such as in accordance with Society of Automotive Engineers standard J1939, for use in establishing peak available engine torque maximum and minimum data for use in the present control.

Figure 8:
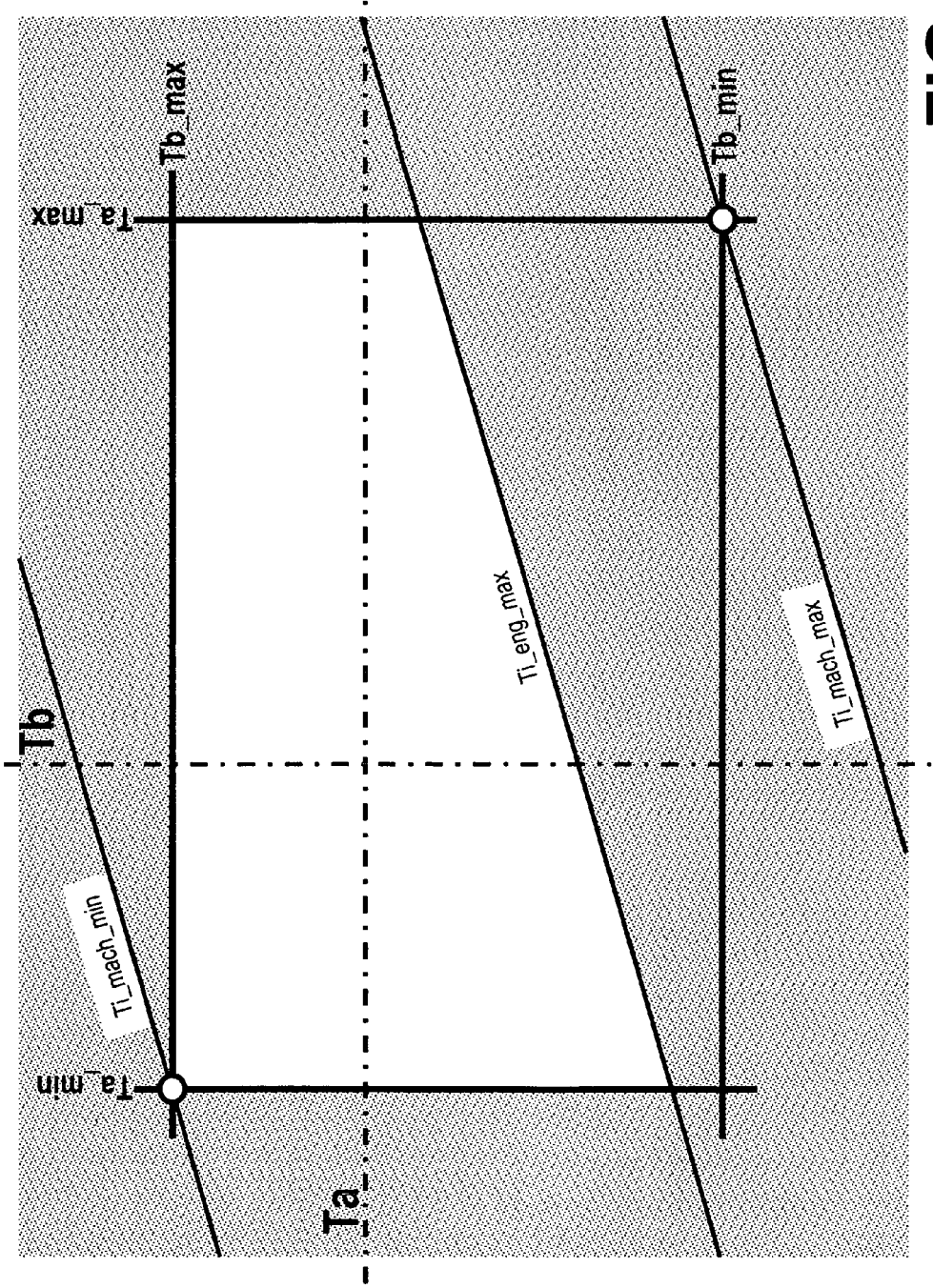

The most constrained input torques from the respective maximum and minimum machine and engine torques (Ti_mach_max, Ti_mach_min, Ti_eng_max, Ti_eng_min) are selected at block 178 as the maximum and minimum input torques, Ti_max and Ti_min. With reference to FIG. 7, an exemplary maximum input torque as a function of the engine torque limit is labeled Ti_eng_max. In this example in FIG. 7, Ti_eng_max is less constraining than the maximum input torque as a function of the machine torque limits, Ti_mach_max, i.e. is not less than Ti_mach_max. With reference to FIG. 8, an exemplary maximum input torque as a function of the engine torque limit is labeled Ti_eng_max. Such engine torque limit derived input torque is, in this example, more constraining than the maximum and minimum input torques as functions of the machine torque limits, Ti_mach_max and Ti_mach_min. The remaining feasible torque space—now further limited by the additional maximum input torque determined as a function of engine torque limits—is represented by the now contracted central unshaded portion of FIG. 8. The present example of FIG. 8 assumes that no further constraints upon the Ta-Tb space are provided by the engine with respect to minimum torques. However, it should be understood that such constraints could be plotted in similar fashion.

Figure 9:
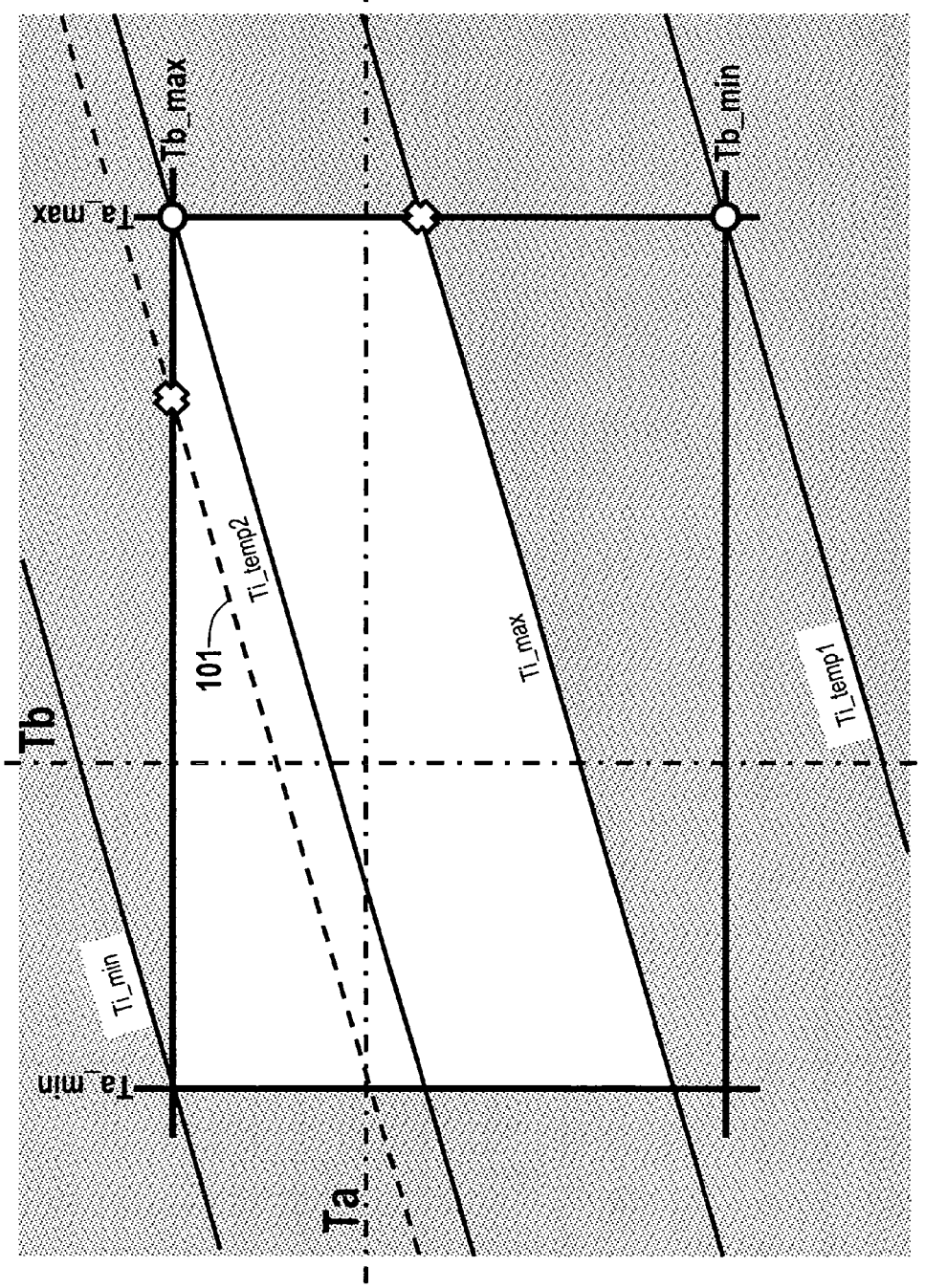

Next at block 180, and with additional reference to FIG. 9, evaluations are performed that are necessary only in MODE 2 operation since in MODE 1 operation any engine torque limitations upon the Ta-Tb space is accounted for, as previously alluded to, by substitution of the more constraining input torque for the appropriate one of Ta_max and Ta_min. In block 180, Ti_max and Ti_min are evaluated with respect to the input torques calculated corresponding to the machine torque limits pairs at the four intersections of Ta_max, Ta_min, Tb_max and Tb_min. It is known from system Ta-Tb space characterizations (see FIG. 4A) that only the two sets of co-adjacent pairs of machine torque limits corresponding to Ta_max and Tb_max need to be evaluated against Ti_max. And, it is also known that only the two sets of co-adjacent pairs of machine torque limits corresponding to Ta_min and Tb_min need to be evaluated against Ti_min. Adjacent sets of machine torque limit pairs are provided to the model to determine working values for input torques. For example, Ta_max and Tb_min are provided to the model to calculate a first value (Ti_temp1) for input torque. Similarly, the adjacent set of machine torque limits, Ta_max and Tb_max, are provided to the model to calculate a second value (Ti_temp2) for input torque. Ti_max is then evaluated against the two machine limit torque values, Ti_temp1 and Ti_temp2, to determine whether Ti_max intersects Ta_max. In the present example for Ti_max, it can be seen that Ti_max falls between the machine limited torque values, Ti_temp1 and Ti_temp2, as shown by the intersection of Ti_max with Ta_max. This result determines that motor A—corresponding to machine limited maximum torque Ta_max—is the constraining machine with respect to the least constrained output torque production at maximum input torque, Ti_max. If Ti_max instead happened to fall between the co-adjacent machine limited torque limit pairs corresponding to Tb_max, i.e. (Ta_max, Tb_max) and (Ta_min, Tb_max) as shown by the intersection of the broken line labeled 101 with Tb_max, then this result instead determines that motor B —corresponding to machine limited maximum torque Tb_max—is the constraining machine with respect to the least constrained output torque production at maximum input torque, Ti_max. While this evaluation process has been described with respect to Ti_max, the same procedure, calculations and determinations are performed with respect to Ti_min and machine constrained output torque production. However, the evaluation with respect to determining the constraining machine with respect to the least constrained output torque production at minimum input torque, Ti_min, is performed in relation to the two co-adjacent sets of machine torque limit pairs corresponding to Ta_min and Tb_min.

With the maximum and minimum input torques having been calculated by the model in accordance with machine limits or determined in accordance with engine torque limits, and the respective constrained machines corresponding to the least constrained maximum and minimum output torques having been determined, respectively, for the maximum and minimum input torques, block 182 now utilizes the model again in calculating the maximum and minimum output torques for the EVT in accordance with the torque constraint parameters. Once again, manipulation of the model to rearrange for resolution of the desired parameters, in this instance output torque, from the calculated or determined parameter limitations or constraints results in the present form where machine A is the determined constraining machine as follows:

$$\begin{bmatrix} To \\ Tb \end{bmatrix} = [K_5] \begin{bmatrix} Ti \\ Ta \\ Ni\_dot \\ No\_dot \\ Ucl \end{bmatrix} \quad (5)$$

where, as distinguished from the model as represented in similar model equations herein above,

[$K_5$] is a 2×5 matrix comprising the rearranged parametric values of the model as set forth herein above;

Ti is Ti_max or Ti_min as calculated or determined in accordance with the machine or engine torque limits and further in accordance with the desired output torque limit to be determined (e.g. To_max_TaTbTi or To_min_TaTbTi, respectivly); and Ta is Ta_max or Ta_min in accordance with the desired output torque limit to be determined (e.g. To_max_TaTbTi or To_min_TaTbTi, respectively).

Similar manipulation or rearrangement of the model is performed where machine B is the determined constraining machine as follows:

$$\begin{bmatrix} To \\ Ta \end{bmatrix} = [K_6] \begin{bmatrix} Ti \\ Tb \\ Ni\_dot \\ No\_dot \\ Ucl \end{bmatrix} \quad (6)$$

where, as distinguished from the model as represented in similar model equations herein above,

[$K_6$] is a 2×5 matrix comprising the rearranged parametric values of the model as set forth herein above; and Ti is Ti_max or Ti_min as calculated or determined in accordance with the machine or engine torque limits and further in accordance with the desired output torque limit to be determined (e.g. To_max_TaTbTi or To_min_TaTbTi, respectivly); and Tb is Tb_max or Tb_min in accordance with the desired output torque limit to be determined (e.g. To_max_TaTbTi or To_min_TaTbTi, respectively).

Figure 10:
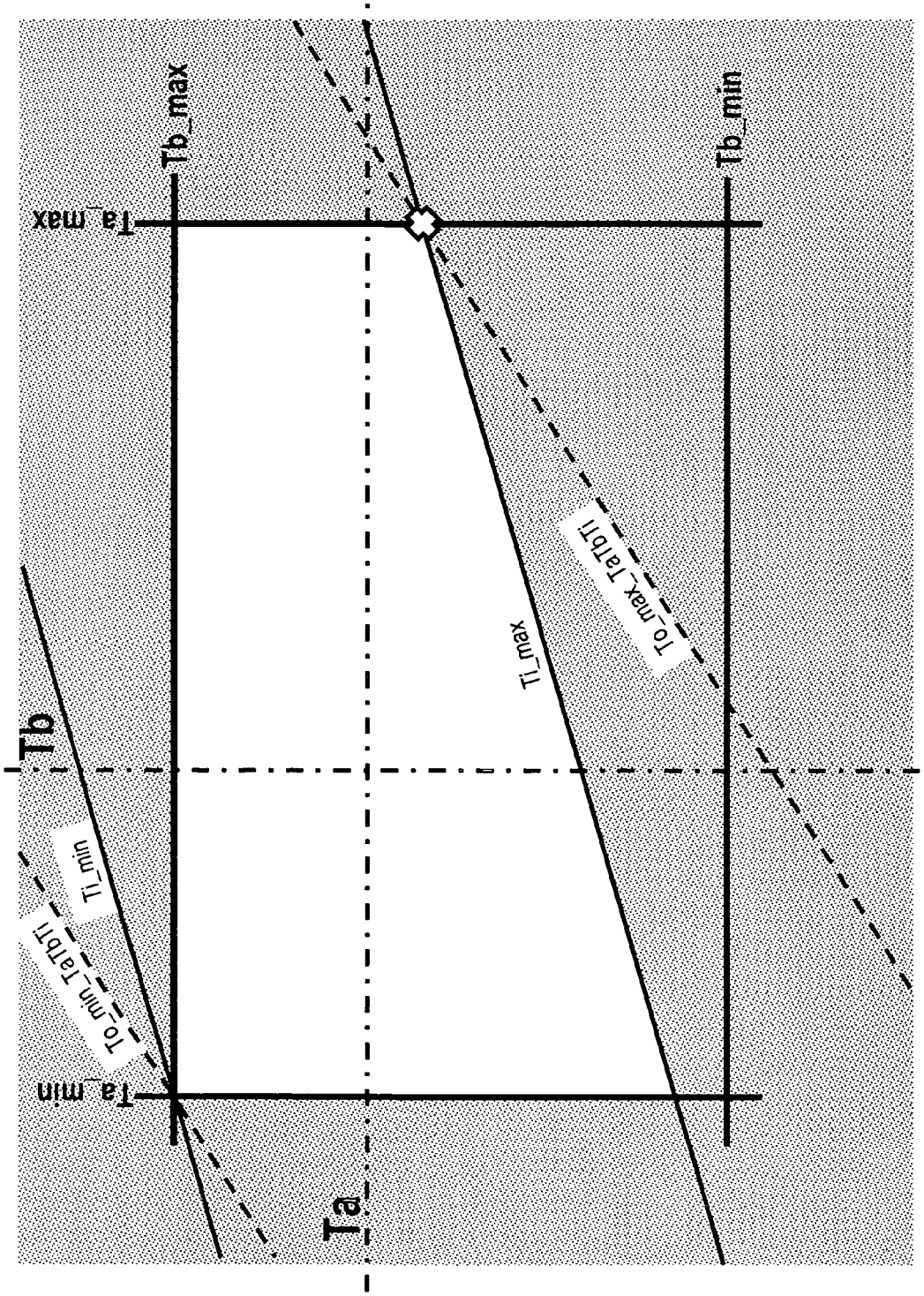

Reference is made to FIG. 10 which illustrates the To_max_TaTbTi determined with respect to the foregoing description. It is noted that in MODE 1, relationship (6) is used to calculate To_max_TaTbTi.

One skilled in the art will appreciate from the foregoing description and with recollection of the Ta-Tb space of the various FIGS. 7–10 that MODE 1 operation will always return a maximum output torque for present torque constraint parameters at the Ta_min, Tb_max point and a minimum output torque for present torque constraint parameters at the Ta_max, Tb_min point. This is true in MODE 1 whether the engine torque constrains the Ta-Tb space or not so long as constraining engine torques are reflected by substitution as discussed for the appropriate Ta limit, Ta_max or Ta_min. It will further be appreciated that in MODE 2 operation, if the engine does not constrain the Ta-Tb space, the maximum and minimum output torques will be associated with the Ta_max, Tb_min point and a minimum output torque at the Ta_min, Tb_max point.

Thus far, only torque parameters related to the machines and the engine have been considered in determination of the maximum and minimum output torques. Further description is given herein below in consideration of battery power parameters in determination of maximum and minimum output torques. Reference is made to the flow charts of FIGS. 12 and 13 and the more detailed Ta-Tb space diagrams of FIGS. 14–19. The flow charts illustrate representative steps for carrying out the method of the present invention comprising instructions implemented as part of the executable computer code and data structures of system controller 43. The instructions represented thereby are, of course, executed as a part of a much larger group of instruction sets and routines carrying out the various control and diagnostic function of the powertrain previously described.

Figure 12:
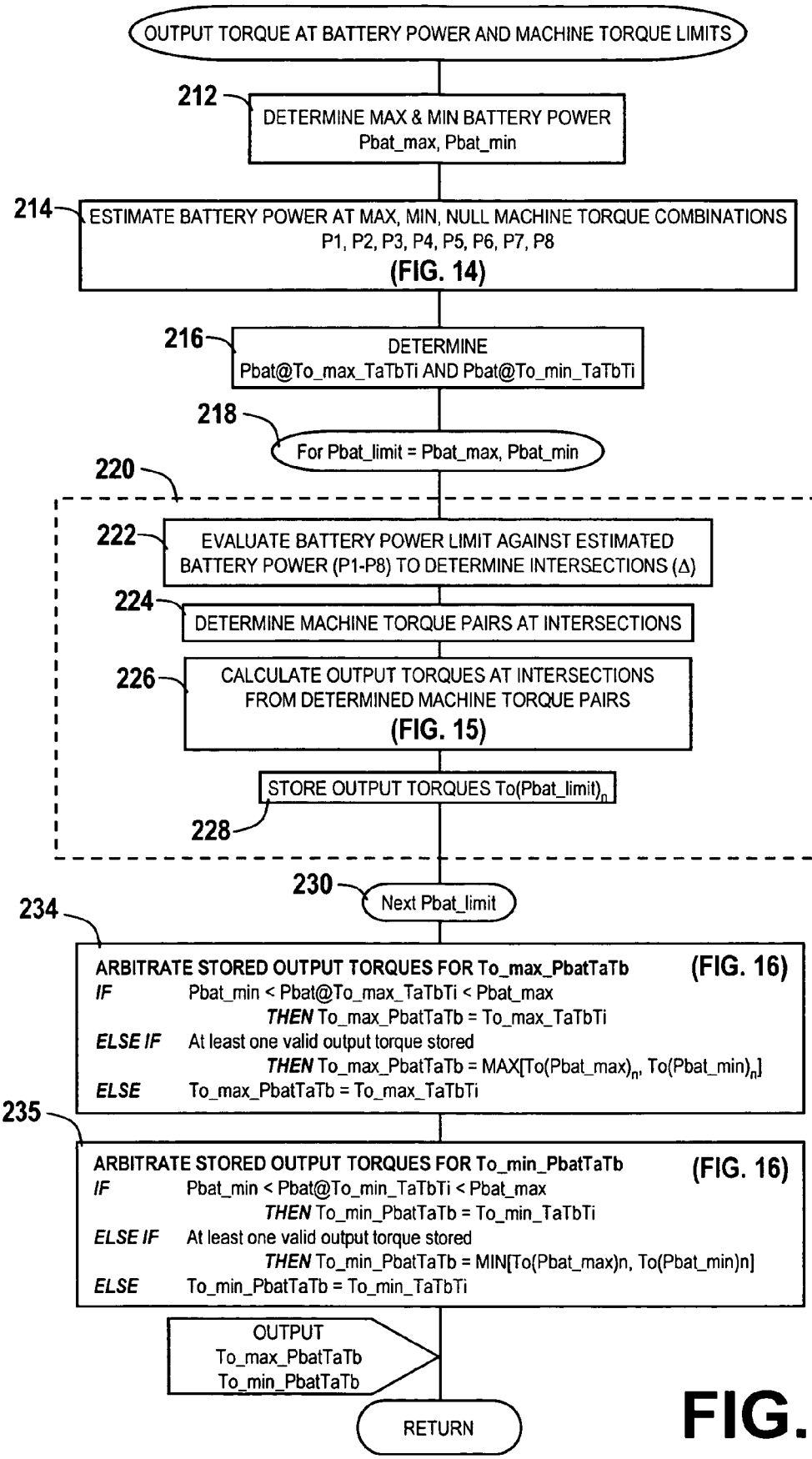
FIG. 12 is a flow chart illustrating exemplary steps in a set of instructions executed by a computer based controller particularly related to dynamically determining peak output torque in accordance with the present invention.

With reference to FIG. 12, a series of processes are illustrated for the determination of output torque limits in consideration of battery power constraints and machine torque constraints. Particularly with respect to block 212, limits or constraints on battery power, Pbat_min and Pbat_max, within the present condition capabilities of the batteries are preferably determined based on data sets stored in table form within data structures in system controller 43. Such data sets are provided for reference by the routine in pre-stored table format having been correlated to various conditions, e.g. state of charge, temperature, voltage and usage (amp-hour/hour). A preferred method of determining minimum and maximum battery power is disclosed in commonly assigned and co-pending U.S. Ser. No. 10/686,180 which is incorporated herein by reference. Table referenced data may further be adjusted in accordance with an offset (Pbat_limit_offset) determined, for example, by a filtered difference between estimated battery power and measured battery power as further described herein below and substantially in accordance with the following relationship:

$$Pbat\_max = Pbat\_max\_lu + Pbat\_limit\_offset; \text{ and} \quad (7)$$

$$Pbat\_min = Pbat\_min\_lu + Pbat\_limit\_offset \quad (8)$$

Where
Pbat_max_lu and Pbat_min_lu are table referenced values for maximum and minimum battery power, respectively; and Pbat_lim_offset is a filtered difference between estimated battery power and measured battery power as further detailed herein below in accordance with the relationship (12).

Estimates of battery power (Pbat_est) are provided pursuant to block 214 of FIG. 12 in accordance with the following relationship:

$$Pbat\_est = Pmotor\_A + Ploss\_A + Pmotor\_B + Ploss\_B \quad (9)$$

where
Pmotor_A and Pmotor_B are unit A and unit B motor power, respectively; and
Ploss_A and Ploss_B are unit A and unit B aggregate motor and power electronics losses (motor losses), respectively.

Pmotor_A and Pmotor_B are further resolved in accordance with motor torque-speed relationships as follows:

$$Pmotor\_A = Ta * Na; \text{ and} \quad (10)$$

$$Pmotor\_B = Tb * Nb \quad (11)$$

where
Ta is motor A torque;
Tb is motor B torque;
Na is motor A speed; and
Nb is motor B speed.

Figure 11A:
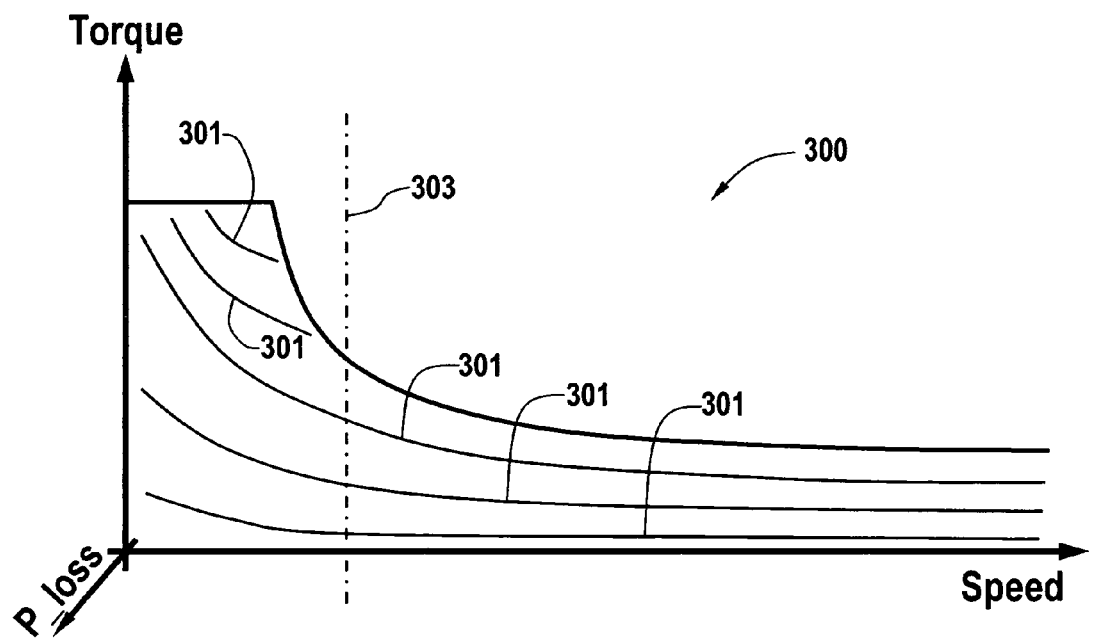
FIGS. 11A and 11B illustrate characteristic machine torque, speed and power loss relationships.
Figure 11B:
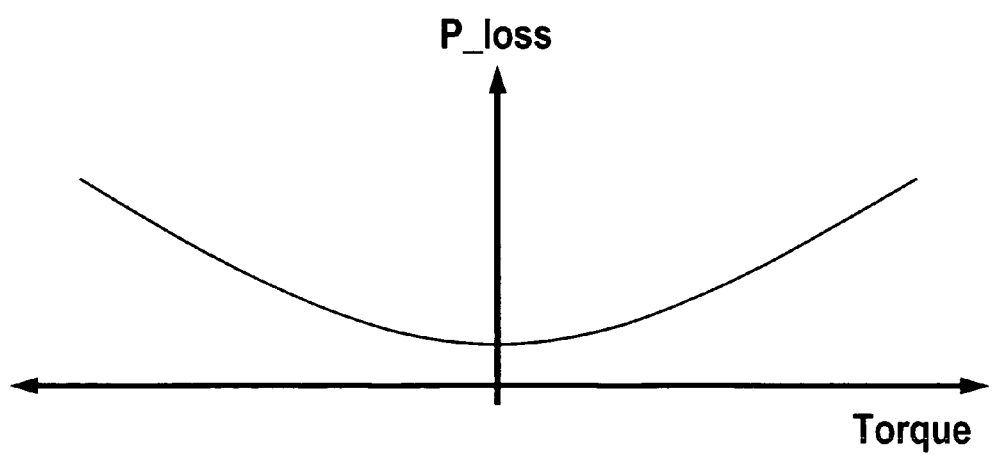

Preferably, Ploss_A and Ploss_B are obtained from data sets stored in table form within data structures in system controller 43. Such data sets are provided for reference by the routine in pre-stored table format with power losses having been correlated to motor torque and speed and referenced thereby. Power losses are, for example, empirically derived from conventional dynamometer testing of the combined motor and power electronics (e.g. power inverter). With reference to FIGS. 11A and 11B, torque-speed-power loss characteristics for typical rotating electric machines are shown. In FIG. 11A, lines of constant power loss 301 are shown plotted on the torque-speed plane for the motor. Broken line labeled 303 corresponds to a plane of constant motor speed and, as viewed in relation to FIG. 11B, illustrates the generally parabolic characteristics of power loss versus motor torque.

The difference between the estimated battery power, Pbat_est, and the measured electrical power input provides the previously mentioned offset, after filtering, as follows:

$$Pbat\_limit\_offset = Filter(Pbat\_est - Pbat\_meas) \quad (12)$$

where
Pbat_meas is determined in accordance with the following relationship:

$$Pbat\_meas = I * V \quad (13)$$

where
I is current delivered to the motors; and
V is the voltage at which the currents are provided.

In accordance with block 214 of FIG. 12, a plurality of key machine torque combinations or pairs (Ta, Tb) are used in conjunction with the relationships (9) through (11) herein above to estimate battery power at those combinations. Selected for the combinations are known torque maximums, minimums and null values, i.e. Ta=Ta_max, Ta=0, Ta=Ta_min, Tb=Tb_max, Tb=0 and Tb=Tb_min. These key combinations are clearly illustrated with reference to FIG. 14, variously labeled P1–P8 at the outer limits of the Ta-Tb feasible torque space. Therefore, with both motor speeds being known and both motor torques being known, estimated battery power corresponding to key combinations P1–P8 are provided by relationship (9) set forth herein above.

At block 216 the battery powers associated with the maximum and minimum output torques, To_max_TaTbTi and To_min_TaTbTi, for the maximum and minimum machine torque pairs as previously described in reference to FIG. 6 are determined. Blocks 218 and 230 merely set up iterative execution of the block set 220 described further herein below. The block set 220 executes once for each of the maximum and minimum battery power limits (Pbat_limit), Pbat_max and Pbat_min.

Block 222 performs an evaluation relative to the maximum and minimum battery powers, Pbat_max and Pbat_min, and the estimated battery power associated with each of the key combinations, P1–P8. Adjacent ones of the estimated battery powers at P1–P8 are systematically compared to Pbat_max and Pbat_min, for example as follows with respect to the key combinations.

P1<Pbat_max<P2  P1<Pbat_min<P2
P2<Pbat_max<P3  P2<Pbat_min<P3
P3<Pbat_max<P4  P3<Pbat_min<P4
P4<Pbat_max<P5  P4<Pbat_min<P5
P5<Pbat_max<P6  P5<Pbat_min<P6
P6<Pbat_max<P7  P6<Pbat_min<P7
P7<Pbat_max<P8  P7<Pbat_min<P8
P8<Pbat_max<P1  P8<Pbat_min<P1

Where Pbat_max or Pbat_min intersect machine torque limits between battery powers associated with the key combinations, it is assumed that the respective battery power limit (Pbat_max or Pbat_min) further constrains the feasible system torque space in Ta-Tb as established by the machine torque limits, Ta_max, Ta_min, Tb_max and Tb_min. With additional reference to FIG. 14, Pbat_max is seen intersecting ($\Delta$) Tb_max between P1 and P2 and Tb_min between P6 and P7. Similarly, Pbat_min is seen intersecting ($\Delta$) Ta_min between P3 and P4 and Tb_min between P5 and P6.

Next, at block 224, machine torque pairs corresponding to the intersections ($\Delta$) at the respective Ta and Tb maximum and minimum limits are determined through the battery power estimate relationship (9), repeated immediately below.

$$Pbat\_est = Pmotor\_A + Ploss\_A + Pmotor\_B + Ploss\_B \qquad (9)$$

Recalling with reference to the substantially parabolic characteristics of the battery power losses as illustrated in FIGS. 11A and 11B, a general quadratic formula provides satisfactory correspondence of the battery power loss data to motor torque and speed. The general forms of the quadratic loss relationships for each motor A and B power loss are set forth below:

$$Ploss\_A = Xa_n * Ta^2 + Ya_n * Ta + Za_n \qquad (14)$$

$$Ploss\_B = Xb_n * Tb^2 + Yb_n * Tb + Zb_n \qquad (15)$$

where
  $Xa_n$, $Ya_n$ and $Za_n$ are empirically determined coefficients corresponding to motor A at a plurality of predetermined motor speed breakpoints n; and
  $Xb_n$, $Yb_n$ and $Zb_n$ are empirically determined coefficients corresponding to motor B at a plurality of predetermined motor speed breakpoints n.

It has been found that for motor speeds between the predetermined motor speed breakpoints n, simple linear interpolation between adjacent speed breakpoints (e.g. n and n–1) returns coefficients yielding satisfactory correspondence of the battery power loss data to the intermediate motor speed, e.g. n<N<n–1. Substitution of the quadratic loss relationships (14) and (15) set forth herein above, and substitution of the known torque speed relationships (10) and (11) set forth herein above, into to the battery power estimate relationship (9) yields the following relationship.

$$Pbat\_est = Ta*Na + Xa_n*Ta^2 + Ya_n*Ta + Za_n + Tb*Nb + Xb_n*Tb^2 + Yb_n*Tb + Zb_n \qquad (16)$$

Figure 15:
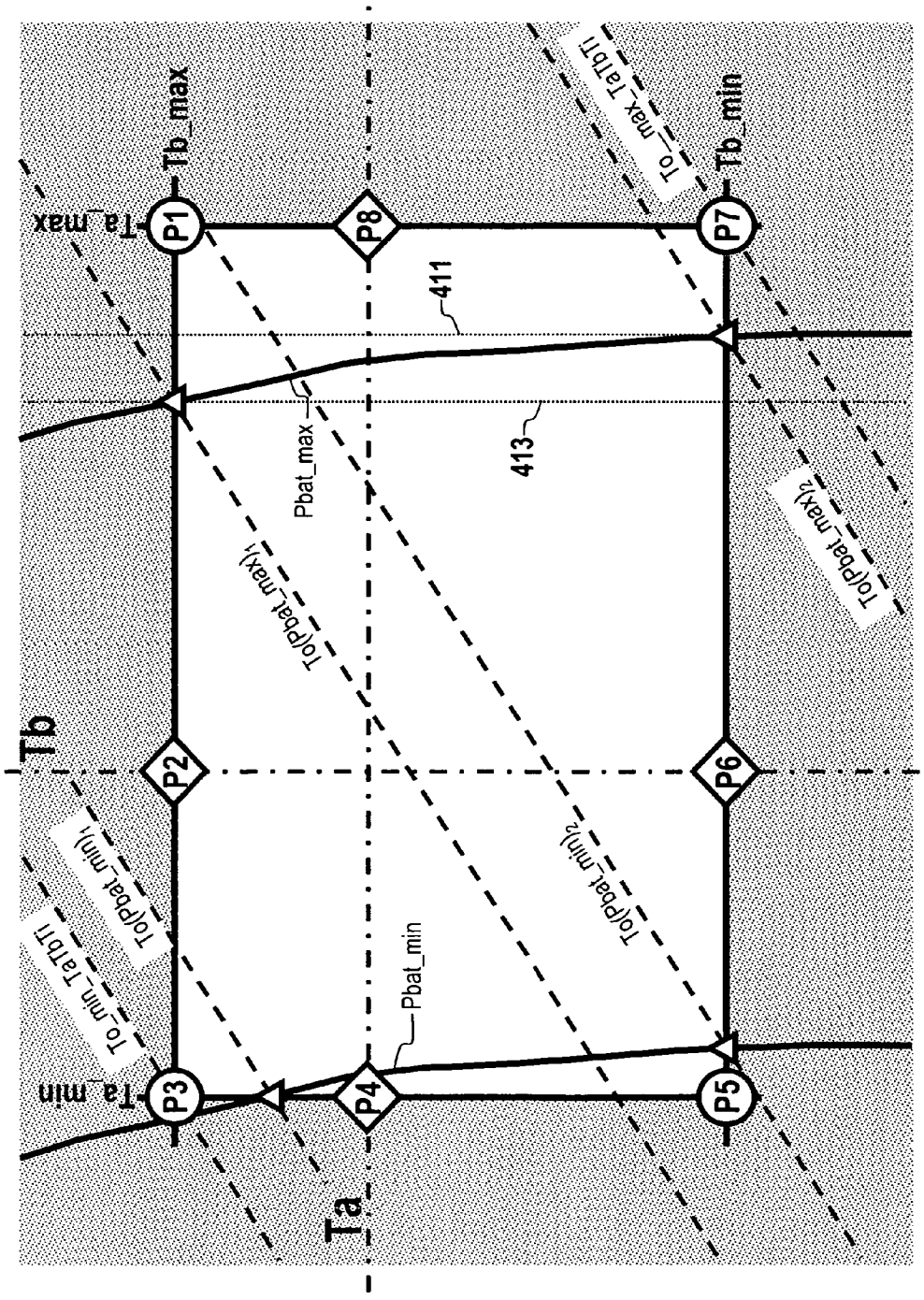

The relationship (16) is then used in the determination of the machine torque pairs, Ta and Tb, at the intersections ($\Delta$) with the respective Ta and Tb maximum and minimum limits. It can be observed that both motor speed Na and Nb are known and that one of the torques Ta and Tb is known, e.g. as one of Ta_max, Ta_min, Tb_max and Tb_min, and the relationship (16) is solved to yield the unknown one of the torques Ta and Tb. In FIG. 15, the unknown machine torques for the maximum battery power, Pbat_max, correspond to motor A torques and are delineated by the vertical dotted lines labeled 411 and 413.

With the machine torque pairs having thus been determined, block 226 next calculates the output torques corresponding thereto. Once again, the EVT model is called upon in the calculation. Here, the arrangement of the model is as in relationship (4) reiterated for convenience herein below.

$$\begin{bmatrix} Ti \\ To \end{bmatrix} = [K_4] \begin{bmatrix} Ta \\ Tb \\ Ni\_dot \\ No\_dot \\ Ucl \end{bmatrix} \qquad (4)$$

With additional reference again to FIG. 15, the four output torques calculated in the present example—subsequent to all iteration being performed—corresponding to the four machine torque pairs at the intersections of the maximum and minimum battery powers with the various machine torque limits ($\Delta$) are illustrated as broken lines (variously labeled To(Pbat_max)$_1$, To(Pbat_max)$_2$, To(Pbat_min)$_1$ and To(Pbat_min)$_2$) further intersecting the respective battery powers and corresponding machine torque limits.

As a final step prior to iteration of or release from block set 220, block 228 next stores all of the output torques associated with the valid intersections as described for further use in an arbitration process described further herein below.

Figure 16:
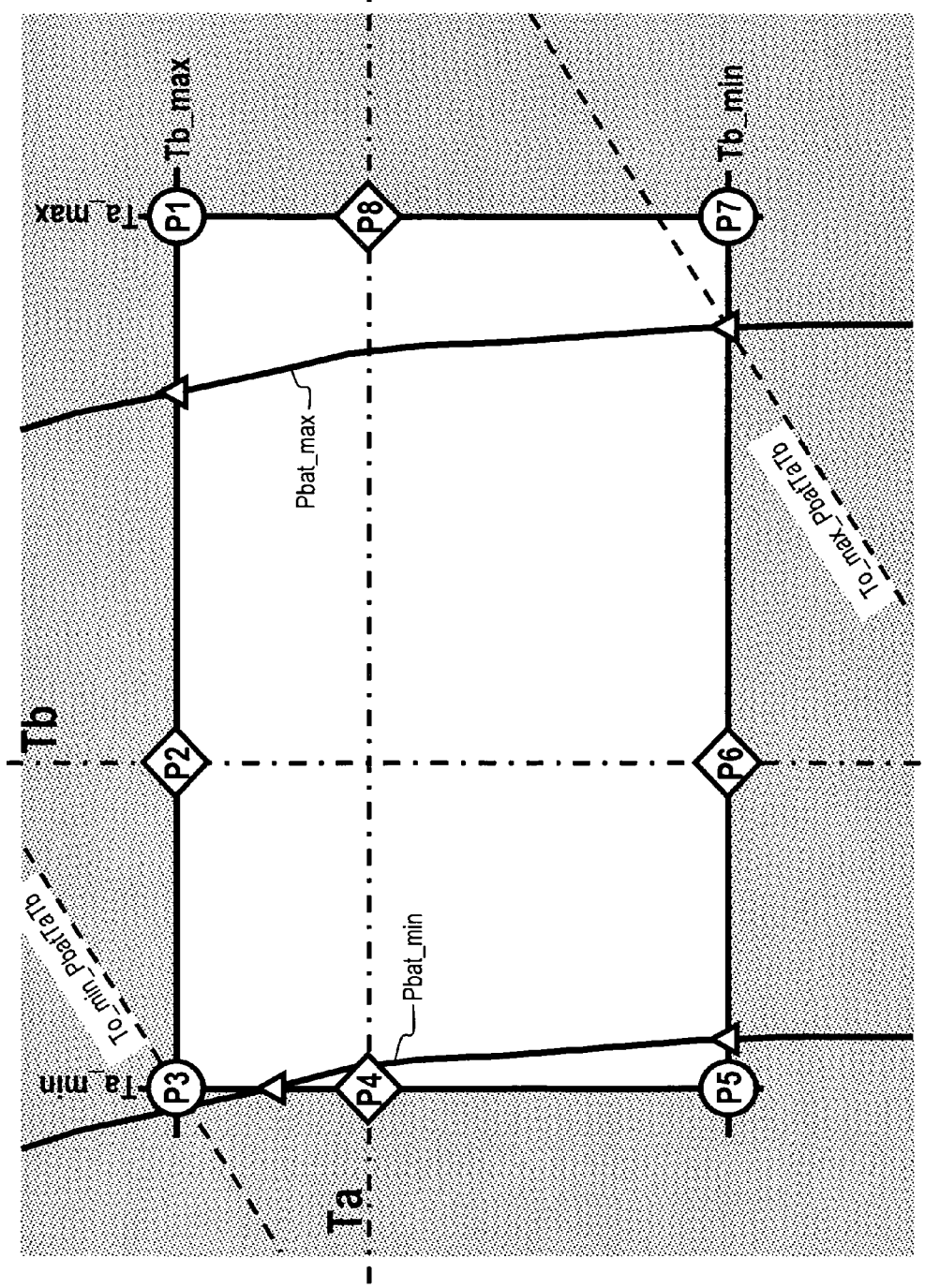
Figure 17:
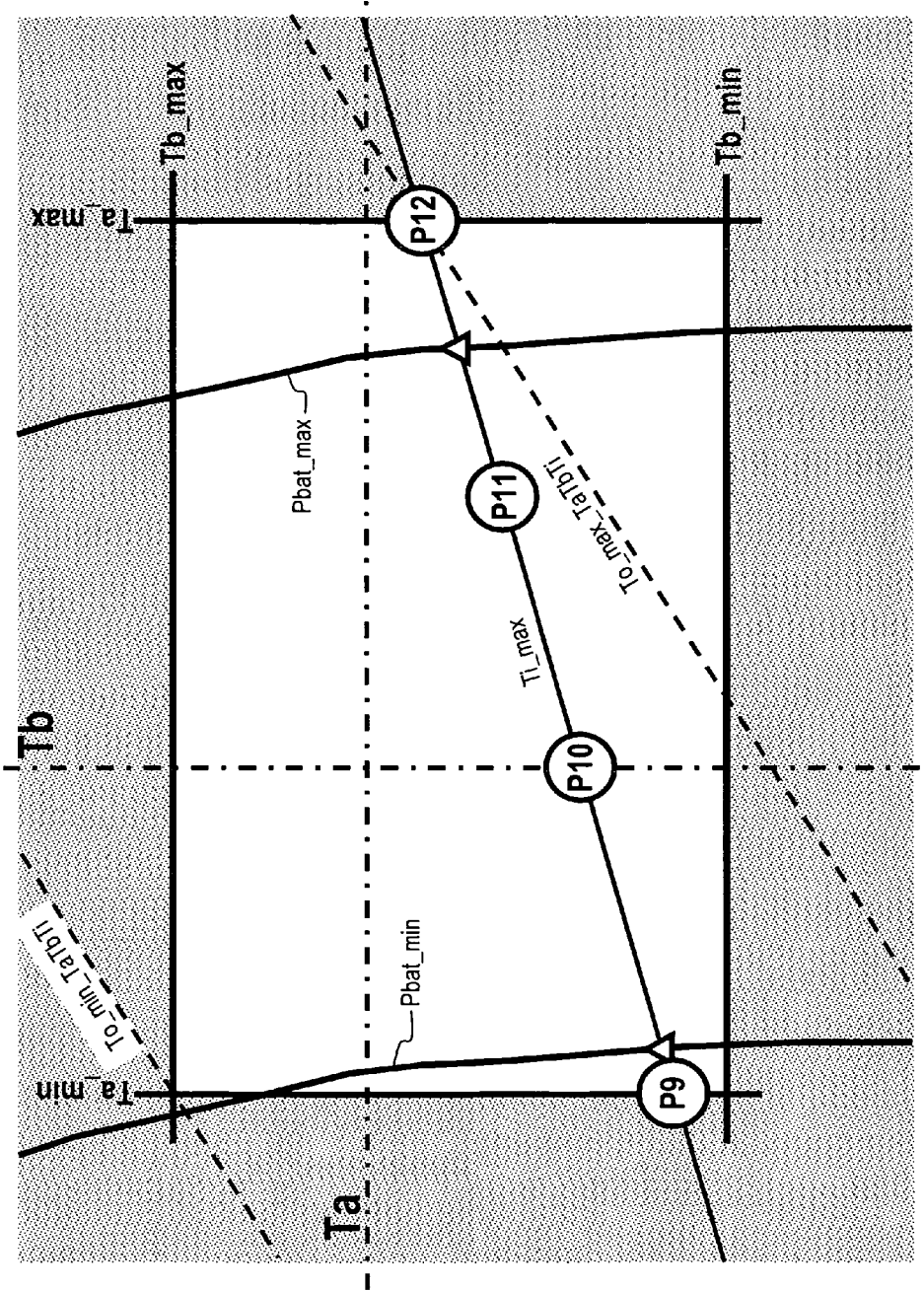
Figure 18:
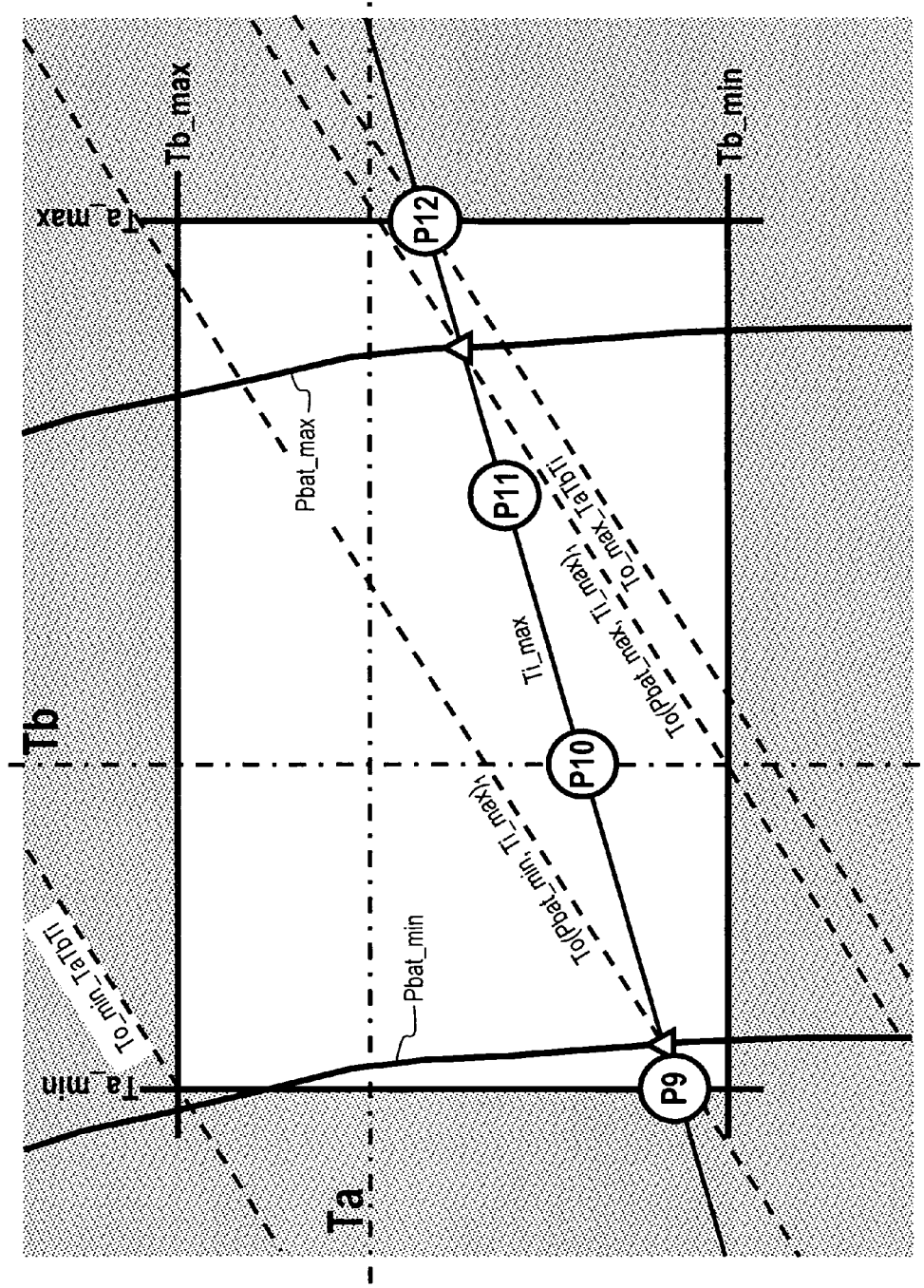

With additional reference now to FIG. 16, block 234 next arbitrates among the plurality of output torques, To(Pbat_max)$_n$ and To(Pbat_min)$_n$, just calculated and To_max_TaTbTi to determine therefrom a maximum output torque. The selected maximum torque from this arbitration in the present example is To(Pbat_max)$_2$ and, therefore, To_max_PbatTaTb is set thereto. Block 235 next arbitrates among the plurality of output torques, To(Pbat_max)$_n$ and To(Pbat_min)$_n$, just calculated and To_min_TaTbTi. The selected minimum torque from this arbitration in the present example is To_min_TaTbTi and, therefore, To_min_PbatTaTb is set thereto. This result can be can be seen clearly in FIG. 16.

Figure 13:
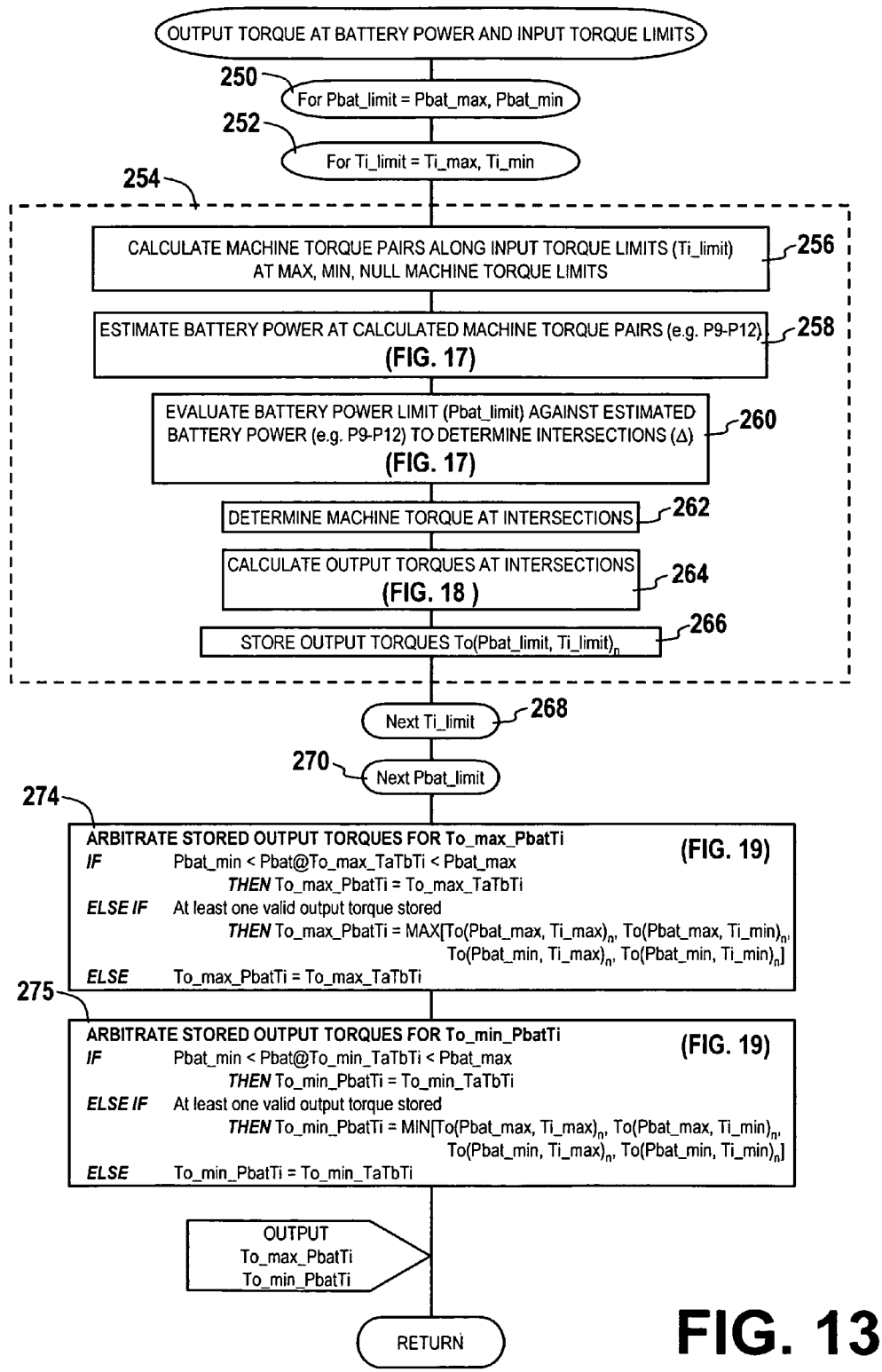
FIG. 13 is a flow chart illustrating exemplary steps in a set of instructions executed by a computer based controller particularly related to dynamically determining peak output torque in accordance with the present invention.
Figure 14:
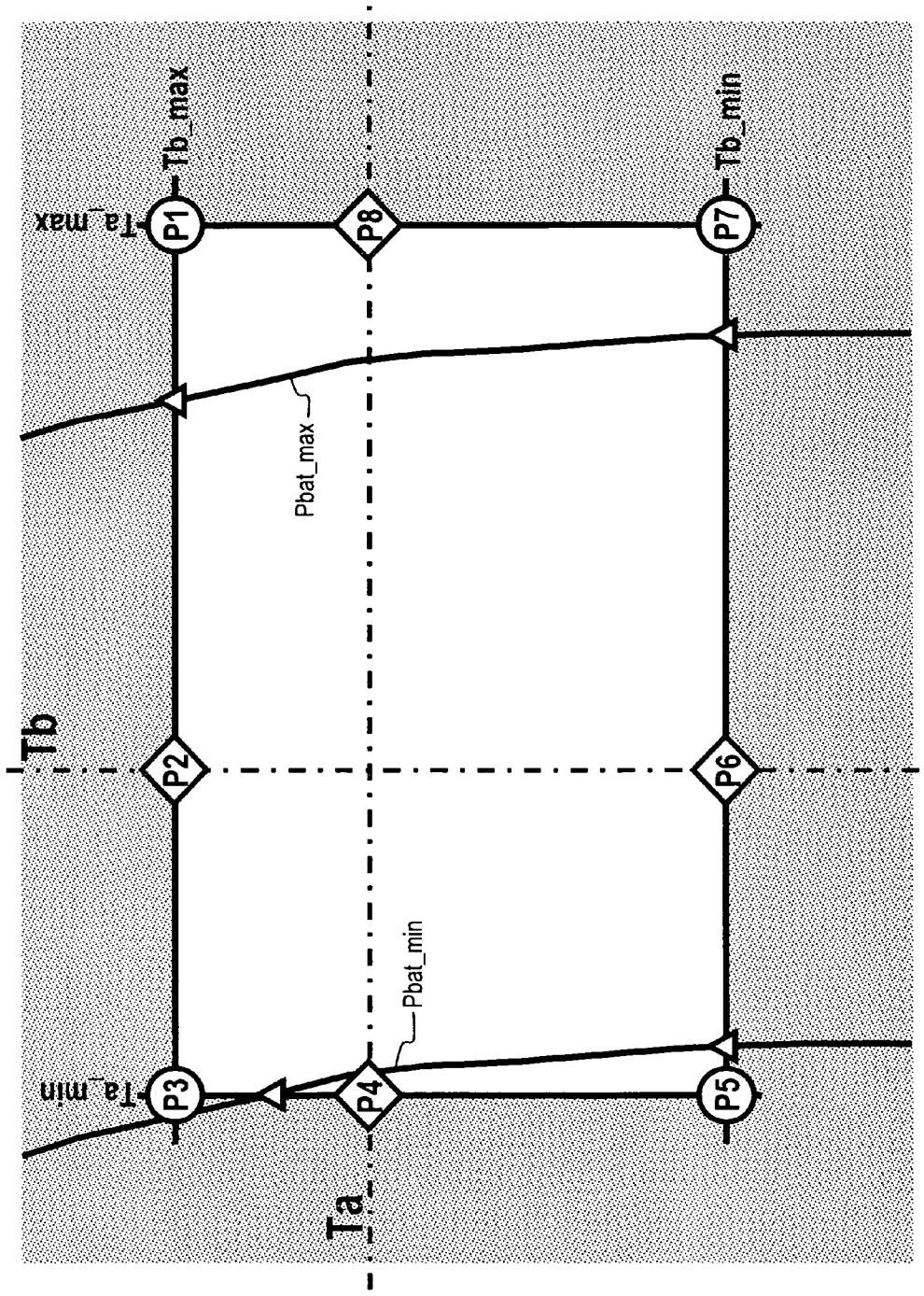
FIGS. 14–19 are graphical representations in Ta-Tb torque space of various steps and results thereof related to dynamically determining peak output torque in accordance with the present invention.

With reference now to FIG. 13, a series of processes are illustrated for the determination of output torque limits in consideration of battery power constraints and engine torque constraints. Particularly with respect to blocks 250, 252, 268 and 270, iterative execution of the block set 254 is enabled thereby. The block set 254 executes once for each of the combinations of maximum and minimum battery power limits (Pbat_max and Pbat_min) and the maximum and minimum engine based input torque limits embodied in the input torque limits (Ti_max and Ti_min).

In accordance with block 256 of FIG. 13, a plurality of key machine torque combinations or pairs (Ta, Tb) corresponding to the minimum and maximum input torques (Ti_max and Ti_min) calculated by the model in accordance with machine or engine torque limits are determined. Here, the arrangement of the model is as in relationships (5) and (6) reiterated for convenience herein below and corresponding to known Ta and known Tb scenarios, respectively:

$$\begin{bmatrix} To \\ Tb \end{bmatrix} = [K_5] \begin{bmatrix} Ti \\ Ta \\ Ni\_dot \\ No\_dot \\ Ucl \end{bmatrix} \quad (5)$$

where,
Ti is Ti_max or Ti_min as calculated or determined in accordance with the machine or engine torque limits; and
Ta is the known machine torque point.

Similarly:

$$\begin{bmatrix} To \\ Ta \end{bmatrix} = [K_6] \begin{bmatrix} Ti \\ Tb \\ Ni\_dot \\ No\_dot \\ Ucl \end{bmatrix} \quad (6)$$

where
Ti is Ti_max or Ti_min as calculated or determined in accordance with the machine or engine torque limits; and
Tb is the known machine torque point.

Two of the key machine torque combinations or pairs (Ta, Tb) correspond to the intersection of each of the respective Ti_max or Ti_min with the machine torque boundary in Ta-Tb and the other two preferably correspond to the intersection of each the respective Ti_max or Ti_min with the machine torque null limit in Ta-Tb. Thus each such intersections provides one of the machine torques for the model to calculate the other of the two machine torques to complete the respective pair. Where a known null Ta-Tb intersection occurs beyond the other machine torque limit, an alternative point may be substituted, e.g. a Ta or Tb established by substitution of a value substantially midway between the two immediately adjacent Ta-Tb pairs. Exemplary key combinations for the illustrated Ti_max are clearly illustrated with reference to FIG. 17 and are variously labeled P9–P12. At block 258 these machine torque pairs are then used in conjunction with the relationship (16) derived herein above to estimate battery power at those combinations.

At block 260, an evaluation is next performed relative to the maximum and minimum battery powers, Pbat_max and Pbat_min, and the estimated battery power associated with each of the key combinations, P9–P12. Adjacent ones of the estimated battery powers at P9–P12 are systematically compared to Pbat_max and Pbat_min, for example as follows with respect to the key combinations.

P9<Pbat_max<P10 P9<Pbat_min<P10
P10<Pbat_max<P11 P10<Pbat_min<P11
P11<Pbat_max<P12 P11<Pbat_min<P12

Where Pbat_max or Pbat_min intersect the maximum input torque, Ti_max, between battery powers associated with the key combinations, it is assumed that the respective battery power limit (Pbat_max or Pbat_min) further constrains the feasible system torque space in Ta-Tb as established by the machine torque limits, Ta_max, Ta_min, Tb_max, Tb_min and the input torque limits, Ti-max and Ti_min. With additional reference to FIG. 17, Pbat_max is seen intersecting (Δ) Ti_max between P11 and P12. Similarly, Pbat_min is seen intersecting (Δ) Ti_max between P9 and P10.

It is desirable to calculate output torque at the intersections of Pbat_max and Pbat_min with Ti_max and Ti_min for further use in final determinations of overall output torque limits in view of machine, engine and battery constraints. At least one of the machine torques, Ta or Tb, at the intersections is necessary in accordance with the model usage for establishing output torque. Therefore, at block 262 a linear estimation, interpolative, section search or other suitable technique is used in reliance on the known Ta, Tb pairs at the estimated battery powers P9–12 to establish the necessary machine torque points corresponding to the intersections.

Step 264 shows output torque at the intersections (Δ) is next calculated using the model and two known torques from at the intersection, preferably the limited input torque, Ti_max (or Ti_min as the case may be) and the determined one of Ta and Tb corresponding to the intersection. Therefore, the arrangement of the model takes the familiar form of the relationships (5) or (6) reiterated for convenience herein below an corresponding to known Ta and known Tb scenarios, respectively:

$$\begin{bmatrix} To \\ Tb \end{bmatrix} = [K_5] \begin{bmatrix} Ti \\ Ta \\ Ni\_dot \\ No\_dot \\ Ucl \end{bmatrix} \quad (5)$$

where
Ti is Ti_max or Ti_min as calculated or determined in accordance with the machine or engine torque limits; and
Ta is the known machine torque point.

Similarly:

$$\begin{bmatrix} To \\ Ta \end{bmatrix} = [K_6] \begin{bmatrix} Ti \\ Tb \\ Ni\_dot \\ No\_dot \\ Ucl \end{bmatrix} \quad (6)$$

where

Ti is Ti_max or Ti_min as calculated or determined in accordance with the machine or engine torque limits; and Tb is the known machine torque point.

With additional reference again to FIG. 18, the output torques calculated in the present example—subsequent to all iteration being performed—corresponding to the intersections (Δ) of the maximum and minimum battery powers with the maximum input torque are illustrated as broken lines (variously labeled To(Pbat_min, Ti_max)$_1$ and To(Pbat_max, Ti_max)$_1$) further intersecting the respective battery powers and corresponding machine torque limits.

As a final step prior to iteration of or release from block set 254, block 266 next stores all of the output torques associated with the valid intersections as described for further use in an arbitration process described further herein below.

Figure 19:
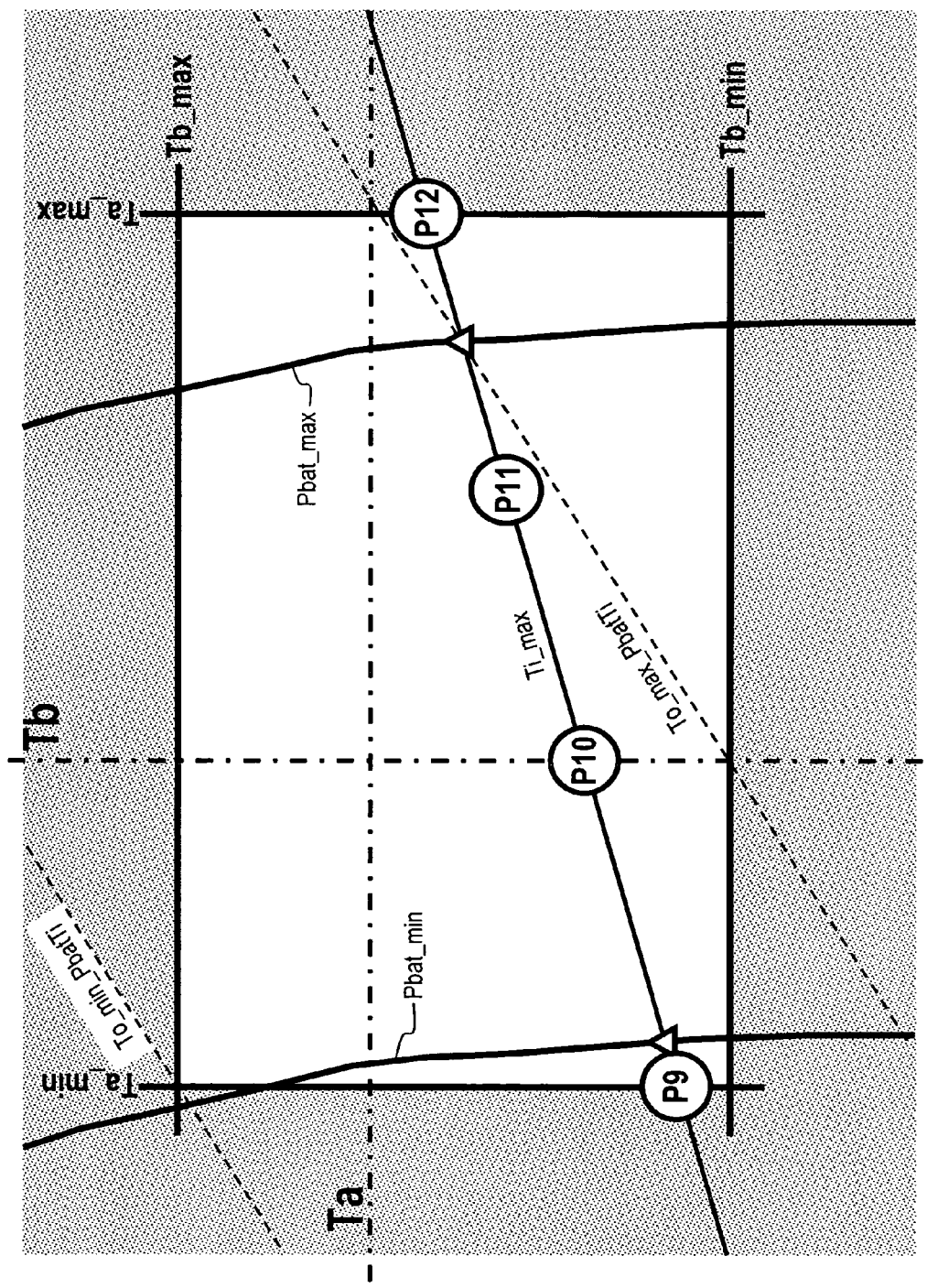

With additional reference now to FIG. 19, block 274 next arbitrates among the plurality of output torques, To(Pbat_max, Ti_max)$_n$, To(Pbat_max, Ti_min)$_n$, To(Pbat_min, Ti_max)$_n$, To(Pbat_min, Ti_min)$_n$, just calculated and To_max_TaTbTi. The selected maximum torque from this arbitration in the present example is To(Pbat_max, Ti_min)$_1$ and, therefore, To_max_PbatTi is set thereto. This result can be can be seen clearly in FIG. 19. Block 275 next arbitrates the plurality of output torques, To(Pbat_max, Ti_max)$_n$, To(Pbat_max, Ti_min)$_n$, To(Pbat_min, Ti_max)$_n$, To(Pbat_min, Ti_min)$_n$, just calculated and To_min_TaTbTi. The selected minimum torque from this arbitration in the present example is To_min_TaTbTi and, therefore, To_min_PbatTi is set thereto. This result can be can be seen clearly in FIG. 19.

Figure 20:
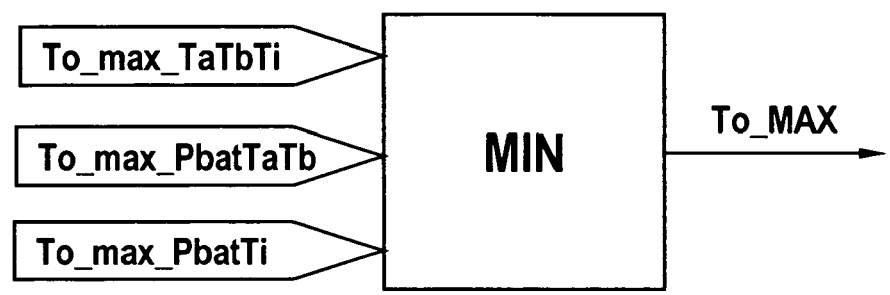
FIG. 20 is a block schematic of a final arbitration performed upon various output torques corresponding to parametrically limited maximum and minimum output torques related to dynamically determining peak output torque in accordance with the present invention.
Figure 20:
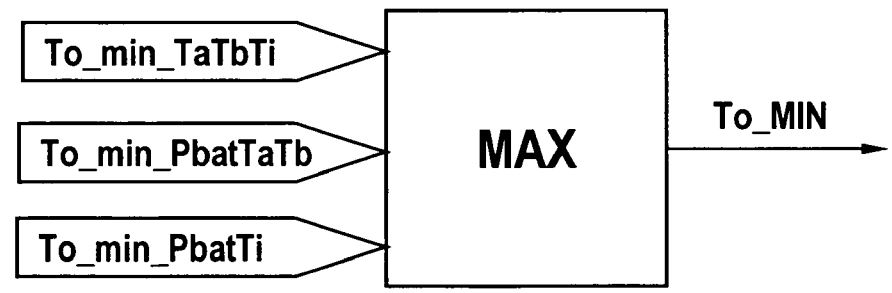

A final arbitration is now performed on the output torques determined to be maximums and minimums with respect to the various limitation combinations described with respect to flow charts of FIGS. 6, 12 and 13. With reference to FIG. 20, the maximum output torques (To_max_TaTbTi, ToMax_PbatTaTb and To_max_PbatTi) are provided to MIN function block to determine the most constrained value therefrom and provides the selection as To_MAX. Similarly, the minimum output torques (To_max_TaTbTi, ToMax_PbatTaTb and To_max_PbatTi) are provided to MAX function block to determine the most constrained value therefrom and provides the selection as To_MIN.

While the invention has been described by reference to certain preferred embodiments and implementations, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for determining output torque limits in a vehicular powertrain comprising an engine, an electrically variable transmission including at least one electric motor, an electrical storage device and a driveline, said engine operatively coupled to the electrically variable transmission at an input thereof, said driveline operatively coupled to the electrically variable transmission at an output thereof, comprising:

determining a feasible motor torque operating space;

determining a first set of output torque limits within the feasible motor torque operating space based upon predetermined motor torque limits and predetermined engine torque limits;

determining a second set of output torque limits within the feasible motor torque operating space based upon predetermined electrical storage device power limits and said predetermined motor torque limits;

determining a third set of output torque limits within the feasible motor torque operating space based upon said predetermined electrical storage device power limits and said predetermined engine torque limits; and determining overall output torque limits of the powertrain as the most constrained of output torques from the first, second and third sets of output torque limits.

2. The method for determining output torque limits as claimed in claim 1 wherein the feasible motor torque operating space is determined to provide torque capacity reservation in said at least one electric motor.

3. The method for determining output torque limits as claimed in claim 1 further comprising:

determining input torque limits as the most constrained of input torques corresponding to said predetermined engine torque limits and said predetermined motor torque limits, wherein said first set of output torque limits are determined as the least constrained of output torques corresponding to said input torque limits at said predetermined motor torque limits.

4. The method for determining output torque limits as claimed in claim 1 wherein said second set of output torque limits are determined as the least constrained of output torques corresponding to said predetermined electrical storage device power limits at said predetermined motor torque limits and output torques corresponding to said predetermined motor torque limits within said predetermined electrical storage device power limits.

5. The method for determining output torque limits as claimed in claim 1 further comprising:

determining input torque limits as the most constrained of input torques corresponding to said predetermined engine torque limits and said predetermined motor torque limits, wherein said third set of output torque limits are determined as the least constrained of output torques corresponding to said predetermined electrical storage device power limits at said input torque limits and output torques corresponding to said input torque limits at said predetermined motor torque limits within said predetermined electrical storage device power limits.

6. The method for determining output torque limits as claimed in claim 3 wherein said third set of output torque limits are determined as the least constrained of output torques corresponding to said predetermined electrical storage device power limits at said input torque limits and output torques corresponding to said input torque limits at said predetermined motor torque limits within said predetermined electrical storage device power limits.

7. Method for determining output torque limits in a vehicular powertrain comprising an engine, an electrically variable transmission including at least one electric motor, an electrical storage device and a driveline, said engine operatively coupled to the electrically variable transmission at an input thereof, said driveline operatively coupled to the electrically variable transmission at an output thereof, comprising:

determining electrical storage device power limits;

determining motor torque limits;

determining engine torque limits;

determining input torque limits as the most constrained of input torques corresponding to said engine torque limits and said motor torque limits;

determining a first set of output torque limits as the least constrained of output torques corresponding to said input torque limits at said motor torque limits;

determining a second set of output torque limits as the least constrained of output torques corresponding to said electrical storage device power limits at said motor torque limits and output torques corresponding to said motor torque limits within said electrical storage device power limits;

determining a third set of output torque limits as the least constrained of output torques corresponding to said electrical storage device power limits at said input torque limits and output torques corresponding to said input torque limits at said motor torque limits within said electrical storage device power limits; and determining overall output torque limits of the powertrain as the most constrained of output torques from the first, second and third sets of output torque limits.

8. The method for determining output torque limits as claimed in claim 7 wherein the engine torque limits are determined in accordance with a set of engine operating parameters.

9. The method for determining output torque limits as claimed in claim 8 wherein the engine torque limits are determined from stored data sets in a controller.

10. The method for determining output torque limits as claimed in claim 8 wherein the engine torque limits are determined in real-time in a controller.

11. The method for determining output torque limits as claimed in claim 7 wherein the motor torque limits are determined in accordance with a set of motor operating parameters.

12. The method for determining output torque limits as claimed in claim 11 wherein the motor torque limits are determined from stored data sets in a controller.

13. The method for determining output torque limits as claimed in claim 7 wherein the electrical storage device power limits are determined in accordance with a set of electrical storage device parameters.

14. The method for determining output torque limits as claimed in claim 13 wherein the electrical storage device power limits are determined based on stored data sets in a controller.

15. The method for determining output torque limits as claimed in claim 7 wherein the motor torque limits are determined to provide a reservation of torque capacity in said at least one electric motor.

16. Method for determining output torque limits in a vehicular powertrain comprising an engine, an electrically variable transmission including at least one electric motor, an electrical storage device and a driveline, said engine operatively coupled to the electrically variable transmission at an input thereof, said driveline operatively coupled to the electrically variable transmission at an output thereof, comprising:

determining least constrained motor limited input torques corresponding to predetermined motor torque limits;

determining engine limited input torques corresponding to predetermined engine torque limits;

selecting input torque limits as the most constrained of the motor limited input torques and engine limited input torques;

determining a first set of output torque limits as the least constrained of output torques corresponding to said input torque limits and said predetermined motor torque limits;

determining a second set of output torque limits as the least constrained of output torques corresponding to predetermined electrical storage device power limits at said predetermined motor torque limits and output torques corresponding to said predetermined motor torque limits within said predetermined electrical storage device power limits;

determining a third set of output torque limits as the least constrained of output torques corresponding to said predetermined electrical storage device power limits at said input torque limits and output torques corresponding to said input torque limits at said predetermined motor torque limits within said predetermined electrical storage device power limits; and determining overall output torque limits of the powertrain as the most constrained of output torques from the first, second and third sets of output torque limits.

17. The method for determining output torque limits as claimed in claim 16 wherein the predetermined engine torque limits are determined in accordance with a set of engine operating parameters.

18. The method for determining output torque limits as claimed in claim 17 wherein the predetermined engine torque limits are determined from stored data sets in a controller.

19. The method for determining output torque limits as claimed in claim 17 wherein the predetermined engine torque limits are determined in real-time in a controller.

20. The method for determining output torque limits as claimed in claim 16 wherein the predetermined motor torque limits are determined in accordance with a set of motor operating parameters.

21. The method for determining output torque limits as claimed in claim 20 wherein the predetermined motor torque limits are determined from stored data sets in a controller.

22. The method for determining output torque limits as claimed in claim 16 wherein the predetermined electrical storage device power limits are determined in accordance with a set of electrical storage device parameters.

23. The method for determining output torque limits as claimed in claim 22 wherein the predetermined electrical storage device power limits are determined based on stored data sets in a controller.

24. The method for determining output torque limits as claimed in claim 16 wherein the predetermined motor torque limits are determined to provide a reservation of torque capacity in said at least one electric motor.

* * * * *